(12) United States Patent
Fujimori et al.

(10) Patent No.: US 11,939,219 B2
(45) Date of Patent: Mar. 26, 2024

(54) CARBON NANOTUBE ASSEMBLED WIRE, CARBON NANOTUBE ASSEMBLED WIRE BUNDLE, AND CARBON NANOTUBE STRUCTURE

(71) Applicants: SUMITOMO ELECTRIC INDUSTRIES, LTD., Osaka (JP); UNIVERSITY OF TSUKUBA, Tsukuba (JP)

(72) Inventors: Toshihiko Fujimori, Osaka (JP); Takeshi Hikata, Osaka (JP); Soichiro Okubo, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

(*) Notice: Subject to any disclaimer, the term of this patent is extended or adjusted under 35 U.S.C. 154(b) by 190 days.

(21) Appl. No.: 17/418,119

(22) PCT Filed: Dec. 26, 2019

(86) PCT No.: PCT/JP2019/051333
§ 371 (c)(1),
(2) Date: Jun. 24, 2021

(87) PCT Pub. No.: WO2020/138379
PCT Pub. Date: Jul. 2, 2020

(65) Prior Publication Data
US 2022/0064002 A1 Mar. 3, 2022

(30) Foreign Application Priority Data

Dec. 27, 2018 (JP) .................................. 2018-245684
Feb. 22, 2019 (JP) .................................. 2019-030645

(51) Int. Cl.
*C01B 32/16* (2017.01)
*B01J 23/745* (2006.01)
(Continued)

(52) U.S. Cl.
CPC ............. *C01B 32/16* (2017.08); *B01J 23/745* (2013.01); *B01J 35/023* (2013.01);
(Continued)

(58) Field of Classification Search
CPC ..... C01B 32/16; C01B 32/168; C01B 32/162; C01B 32/164; C01B 32/158;
(Continued)

(56) References Cited

U.S. PATENT DOCUMENTS

2006/0067871 A1* 3/2006 Hart ........................ C01B 32/18
423/447.3
2006/0131172 A1* 6/2006 Kim ........................ H01J 1/304
204/450
(Continued)

FOREIGN PATENT DOCUMENTS

JP 2005-330175 A 12/2005
JP 2006-169072 A 6/2006
(Continued)

OTHER PUBLICATIONS

Machine Translation of JP 2011-173745 to Nippon Zeon Co (Year: 2011).*
(Continued)

*Primary Examiner* — Daniel C. McCracken
(74) *Attorney, Agent, or Firm* — Oliff PLC

(57) ABSTRACT

The carbon nanotube assembled wire includes a plurality of carbon nanotubes oriented at a degree of orientation of 0.9 or more and 1 or less.

12 Claims, 12 Drawing Sheets

(51) Int. Cl.
*B01J 35/02* (2006.01)
*C01B 32/168* (2017.01)
*H01B 1/06* (2006.01)
*H01B 1/16* (2006.01)

(52) U.S. Cl.
CPC ............. *C01B 32/168* (2017.08); *H01B 1/06* (2013.01); *H01B 1/16* (2013.01); *C01P 2004/04* (2013.01); *C01P 2004/13* (2013.01)

(58) Field of Classification Search
CPC ..... C01B 32/159; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; B01J 23/745; B01J 35/023; B01J 31/2295; B01J 2531/842; H01B 1/06; H01B 1/16; H01B 1/04; C01P 2004/04; C01P 2004/13; B82Y 30/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | | | |
|---|---|---|---|---|
| 2007/0027029 | A1* | 2/2007 | Kasuya | B01J 20/20 502/526 |
| 2007/0224107 | A1 | 9/2007 | Hikata | |
| 2008/0170982 | A1* | 7/2008 | Zhang | D02G 3/44 423/447.3 |
| 2011/0008617 | A1 | 1/2011 | Hata et al. | |
| 2011/0135835 | A1 | 6/2011 | Son et al. | |
| 2014/0217643 | A1 | 8/2014 | Nikawa et al. | |
| 2019/0355490 | A1 | 11/2019 | Yamazaki et al. | |
| 2020/0290877 | A1 | 9/2020 | Hikata et al. | |

FOREIGN PATENT DOCUMENTS

| | | | |
|---|---|---|---|
| JP | 2006-169097 A | 6/2006 | |
| JP | 2011-173745 | * 9/2011 | ............ C01B 31/02 |
| JP | 2011-173745 A | 9/2011 | |
| JP | 2011-207758 A | 10/2011 | |
| WO | 2006/137893 A2 | 12/2006 | |
| WO | 2007/015710 A2 | 2/2007 | |
| WO | 2018/143466 A1 | 8/2018 | |
| WO | 2019/097756 A1 | 5/2019 | |

OTHER PUBLICATIONS

Li, et al., Growth of Single-Walled Carbon Nanotubes from Discrete Catalytic Nanoparticles of Various Sizes, J. Phys. Chem. B. 2001; 105: 11424-11431 (Year: 2001).*
Sato, et al., Growth of diameter-controlled carbon nanotubes using monodisperse nickel nanoparticles obtained with a differential mobility analyzer, Chemical Physics Letters 2003; 382: 361-366 (Year: 2003).*
English (Google) translation of http://www.enomae.com/FiberOri/index.htm, accessed online on Aug. 10, 2023 (Year: 2023).*
English (Google) translation of "Toshiharu Enomae's Homepage," accessed online at http://www.enomae.com/ on Aug. 10, 2023 (Year: 2023).*
English (Google) translation of "Publication list," accessed online at http://www.enomae.com/publish.htm on Aug. 10, 2023 (Year: 2023).*
Enomae, et al., Nondestructive determination of fiber orientation distribution of paper surface by image analysis, Nordic Pulp and Paper Research 2006; 21(2): 253-259 (Year: 2006).*
Black box, accessed online at https://en.wikipedia.org/wiki/Black_box on Aug. 10, 2023. (Year: 2023).*
Lekawa-Raus et al.; "Electrical Properties of Carbon Nanotube Based Fibers and Their Future Use in Electrical Wiring;" Advanced Functional Materials; 2014; pp. 3661-3682; vol. 24.
Fujimori et al . . . ; "Orientation Analysis of Carbon Nanotube Fibers synthesized by Floating-Bridge Method;" Proceedings of the 66th JSAP Spring Meeting; The Japan Society of Applied Physics; 2019; pp. 14-183.
Mar. 3, 2020 Search Report issued in International Patent Application No. PCT/JP2019/051333.
Mar. 3, 2020 Written Opinion of the Interational Searching Authority issued in Interational Patent Application No. PCT/JP2019/051333.
Barreiro et al.; "On the effects of solution and reaction parameters for the aerosol-assisted CVD growth of long carbon nanotubes;" Applied Physics A; 2006; pp. 719-725; vol. 82, No. 4.

* cited by examiner

CARBON NANOTUBE ASSEMBLED WIRE, CARBON NANOTUBE ASSEMBLED WIRE BUNDLE, AND CARBON NANOTUBE STRUCTURE

TECHNICAL FIELD

The present disclosure relates to a carbon nanotube assembled wire, a carbon nanotube assembled wire bundle, and a carbon nanotube structure. The present application claims priority based on Japanese Patent Application No. 2018-245684 filed on Dec. 27, 2018, and Japanese Patent Application No. 2019-030645 filed on Feb. 22, 2019. The entire contents described in the Japanese patent applications are incorporated herein by reference.

BACKGROUND ART

A carbon nanotube (hereinafter also referred to as CNT) composed of a cylindrical graphene sheet made of carbon atoms bonded in a hexagonal pattern is a material having excellent characteristics, such as a weight that is one fifth of that of copper, a strength that is 20 times that of steel, and a metal-like electrical conductivity. Thus, an electric wire using the carbon nanotube is expected as a material contributing to decreased weight and size and improved corrosion resistance of motors for cars in particular.

The carbon nanotube is obtained, for example, through vapor deposition by supplying a carbon-containing source gas while heating a fine catalyst such as iron to grow the carbon nanotube from the catalyst, as described in PTL 1 (Japanese Patent Laid-Open No. 2005-330175).

CITATION LIST

Patent Literature

PTL 1: Japanese Patent Laid-Open No. 2005-330175

Patent Literature

NPL. 1: Agnieszka Lekawa-Raus et al., "Electrical Properties of Carbon Nanotube Based Fibers and Their Future Use in Electrical Wiring," Advanced Functional Materials, Vo. 24, p.p. 3661-3682 (2014). DOI:10.1002/adfm.201303716

SUMMARY OF INVENTION

The presently disclosed carbon nanotube assembled wire is a carbon nanotube assembled wire including a plurality of carbon nanotubes, the carbon nanotube being oriented at a degree of orientation of 0.9 or more and 1 or less.

The presently disclosed carbon nanotube assembled wire bundle is a carbon nanotube assembled wire bundle including a plurality of carbon nanotube assembled wires each described above, the carbon nanotube assembled wire having the carbon nanotube oriented at a degree of orientation of 0.9 or more and 1 or less, the carbon nanotube assembled wire bundle having the carbon nanotube assembled wire oriented at a degree of orientation of 0.8 or more and 1 or less.

The presently disclosed carbon nanotube structure includes:

a carbon nanotube; and a catalyst particle adhering to opposite terminals of the carbon nanotube, the catalyst particle having a diameter of 0.6 nm or more and less than 30 nm.

DETAILED DESCRIPTION

Figure 1:
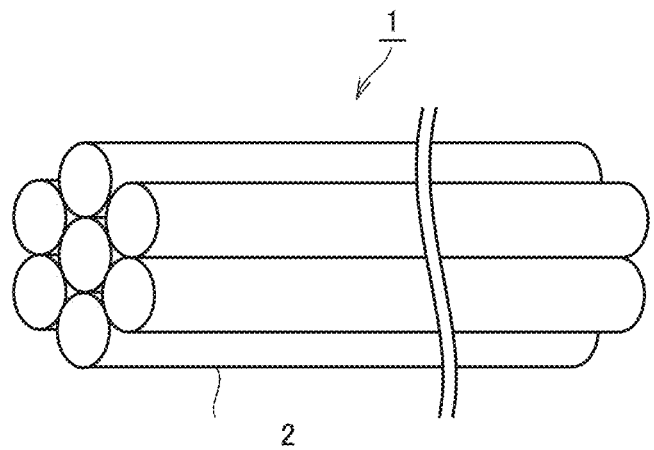
FIG. 1 illustrates a typical exemplary configuration of a carbon nanotube assembled wire in accordance with one embodiment of the present disclosure.

Problem to be Solved by the Present Disclosure

Carbon nanotubes obtained with the state of the art of producing carbon nanotubes have a diameter of about 0.4 nm to 20 nm and a maximum length of about 55 cm. In order to use a carbon nanotube as an electric wire, a high strength material and the like, the carbon nanotube needs to be longer, and accordingly, techniques capable of elongating a carbon nanotube have been studied.

As one method for elongating a carbon nanotube, a method for orienting and assembling a plurality of carbon nanotubes together in a longitudinal direction to be an assembled wire may be considered.

As one such method, there has been studied a method for obtaining a carbon nanotube assembled wire (hereinafter also referred to as a CNT assembled wire) by mixing a plurality of non-oriented CNTs with a dispersing agent (e.g., a surfactant, a polymer, or the like) and injection-molding the mixture into fibers (see NPL 1: Agnieszka Lekawa-Raus et al., "Electrical Properties of Carbon Nanotube Based Fibers and Their Future Use in Electrical Wiring," Advanced Functional Materials, Vo. 24, p.p. 3661-3682 (2014). DOI: 10.1002/adfm.201303716).

It is an object of the present disclosure to provide a CNT assembled wire formed of CNTs oriented in their longitudinal direction, assembled together and elongated, and a bundle of carbon nanotube assembled wires (hereinafter also referred to as a CNT assembled wire bundle).

It is another object of the present disclosure to provide a carbon nanotube structure that can be used for the above CNT assembled wire and CNT assembled wire bundle (hereinafter also referred to as a CNT structure).

Advantageous Effect of the Present Disclosure

In accordance with the above aspect, there can be provided a CNT assembled wire formed of CNTs oriented in their longitudinal direction, assembled together and elongated, and a bundle of such CNT assembled wires.

Description of Embodiments of the Present Disclosure

Initially, aspects of the present disclosure will be described one by one.

(1) A carbon nanotube assembled wire in accordance with one aspect of the present disclosure is a carbon nanotube assembled wire including a plurality of carbon nanotubes, the carbon nanotube being oriented at a degree of orientation of 0.9 or more and 1 or less.

In accordance with the above aspect, there can be provided a CNT assembled wire formed of CNTs oriented in their longitudinal direction, assembled together and elongated.

(2) Preferably, the carbon nanotube assembled wire includes at least one type of metal element selected from the group consisting of iron, nickel, cobalt, molybdenum, gold, silver, copper, yttrium, chromium, palladium, platinum and tungsten, and the metal element is dispersed in the carbon nanotube assembled wire in the longitudinal direction thereof.

According to this, the CNT assembled wire can maintain the CNT's inherent electrical conductivity.

(3) Preferably, the carbon nanotube assembled wire includes catalyst particles, and the catalyst particles have an average particle diameter of 0.6 nm or more and less than 30 nm.

According to this, the CNT assembled wire can maintain the CNT's inherent electrical conductivity.

(4) The catalyst particles preferably include iron. This allows mass production of elongate CNT assembled wires.

(5) Preferably, the carbon nanotube assembled wire includes the element of sulfur, and the element of sulfur is dispersed in the carbon nanotube assembled wire in the longitudinal direction thereof.

According to this, the CNT assembled wire can maintain the CNT's inherent electrical conductivity, mechanical property, and the like.

(6) A carbon nanotube assembled wire bundle in accordance with another aspect of the present disclosure is a carbon nanotube assembled wire bundle including a plurality of carbon nanotube assembled wires each in accordance with item (1) to (5) above, the carbon nanotube assembled wire having the carbon nanotube oriented at a degree of orientation of 0.9 or more and 1 or less, the carbon nanotube assembled wire bundle having an oriented region in which the carbon nanotube assembled wire is oriented at a degree of orientation of 0.8 or more and 1 or less.

In accordance with the above aspect, there can be provided a carbon nanotube assembled wire bundle in which a plurality of carbon nanotube assembled wires each formed of CNTs oriented, assembled together and elongated in their longitudinal direction are oriented and assembled together in their longitudinal direction.

(7) The carbon nanotube assembled wire bundle preferably includes the oriented region and an amorphous region in which the carbon nanotube assembled wire has a degree of orientation of 0 or more and less than 0.8. According to this, by controlling the amorphous region in size, a buffering function against bending and twisting can be optionally added in addition to the carbon nanotube assembled wire's inherent structural flexibility.

(8) In at least a portion of the oriented region, a minimum value of a distance between adjacent ones of the plurality of carbon nanotube assembled wires is preferably 10 times or more an average diameter of the plurality of carbon nanotube assembled wires. According to this, a buffering function against bending or twisting can be added as desired while adjacent carbon nanotube assembled wires do not bond to each other.

(9) The carbon nanotube assembled wire bundle preferably has an elongation at break of 0.1% or more and a breaking strength of 1 GPa or more. According to this, the CNT assembled wire bundle can have excellent mechanical strength.

(10) The carbon nanotube assembled wire bundle preferably has a Young's modulus of 10 GPa or more. According to this, the CNT assembled wire bundle can have excellent mechanical strength.

(11) The carbon nanotube assembled wire bundle preferably includes 10% by mass or less of at least one type of a first element selected from the group consisting of iron, sulfur, nickel, cobalt, molybdenum, gold, silver, copper, yttrium, chromium, palladium, platinum, and tungsten in total.

According to this, the CNT assembled wire bundle can have excellent mechanical strength.

(12) A carbon nanotube structure in accordance with another aspect of the present disclosure is a carbon nanotube structure comprising:
a carbon nanotube; and
a catalyst particle adhering to the carbon nanotube at opposite terminals, the catalyst particle having a diameter of 0.6 nm or more and less than 30 nm.

The carbon nanotube structure can be suitably used for the CNT assembled wire and CNT assembled wire bundle.

(13) The catalyst particle preferably includes iron. According to this, the CNT structure can be used to provide mass production of elongate CNT assembled wires.

Details of Embodiments of the Present Disclosure

A specific example of a carbon nanotube assembled wire, a carbon nanotube assembled wire bundle, and a carbon nanotube structure in accordance with an embodiment of the present disclosure will now be described below with reference to the drawings.

In the drawings of the present disclosure, the same reference numerals designate identical or corresponding parts. In addition, dimensional relations in length, width, thickness, depth, and the like are changed as appropriate for clarity and simplicity of the drawings, and do not necessarily represent actual dimensional relations.

In the present specification, an expression in the form of "A to B" means a range's upper and lower limits (that is, A or more and B or less), and when A is not accompanied by any unit and B is alone accompanied by a unit, A has the same unit as B. Further, a range having an upper limit value of C means that the range has an upper limit which is C or less, and a range having a lower limit value of D means that the range has a lower limit which is D or more.

Embodiment 1: Carbon Nanotube Assembled Wire

<Carbon Nanotube Assembled Wire>
FIG. 1 illustrates a typical exemplary configuration of a carbon nanotube assembled wire (hereinafter also referred to as CNT assembled wire) in accordance with one embodiment of the present disclosure. As shown in FIG. 1, a carbon nanotube assembled wire 1 in accordance with the present embodiment includes a plurality of carbon nanotubes 2. The CNT assembled wire has a plurality of carbon nanotubes 2 oriented at a degree of orientation of 0.9 or more and 1.0 or less.

(Degree of Orientation)
A method for calculating a degree of orientation of a CNT in the present specification will now be described with reference to FIGS. 2 to 5. In the present specification, a CNT's degree of orientation is a value calculated through the following procedure of steps (a1) to (a6). Note that, as measured by the applicants, it has been confirmed that, insofar as a given, single sample is measured, even when a CNT's degree of orientation is measured, as will be described hereinafter, a plurality of times while a location where a field of view (having a size of 10 nm×10 nm) for the measurement is selected is changed, measurement results are obtained without substantial variation.

Figure 2:
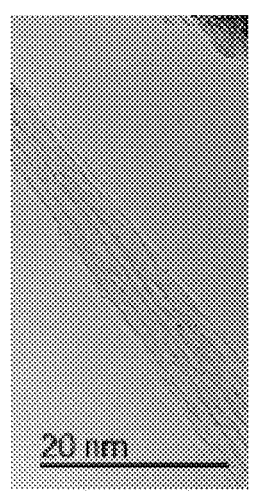
FIG. 2 is an image via a transmission electron microscope (TEM) of an example of a carbon nanotube assembled wire in accordance with an embodiment of the present disclosure.

(a1) Imaging CNT Assembled Wire
The CNT assembled wire is imaged using the following instrument under the following conditions.
Transmission electron microscope (TEM): "JEM2100" (product name) manufactured by JEOL Ltd.
Conditions: a magnification of 50,000 times to 1.2 million times, and an acceleration voltage of 60 kV to 200 kV
FIG. 2 shows an example of a TEM image of the CNT assembled wire in accordance with the present embodiment.

Figure 3:
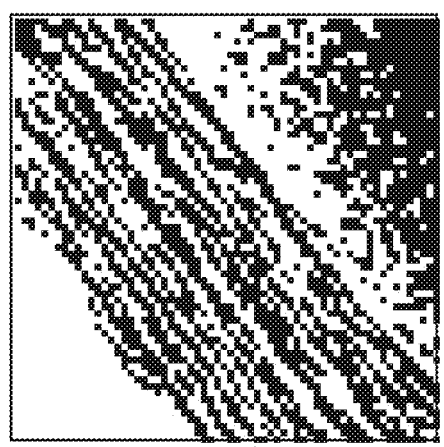
FIG. 3 is an image obtained by binarizing the FIG. 2 TEM image.

(a2) Binarizing the Captured Image
The image captured in the above step (a1) is binarized through the following procedure using the following image processing program.
Image processing program: Non-destructive paper surface fiber orientation analysis program "FiberOri8single03" (www.enomae.com/FiberOri/index.htm)
Processing Procedure
1. Histogram Average Brightness Correction
2. Background Removal
3. Binarization by Single Threshold
4. Brightness Inversion.
FIG. 3 shows an image obtained by binarizing the TEM image of FIG. 2.

Figure 4:
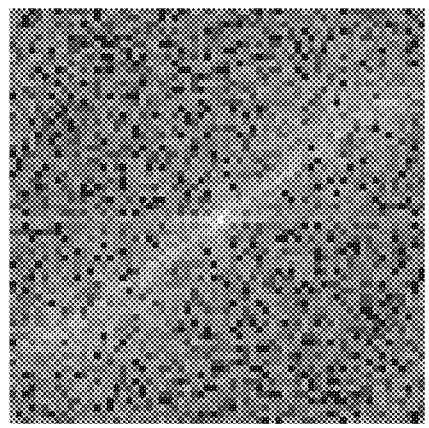
FIG. 4 is an image obtained by subjecting the FIG. 3 binarized image to Fourier-transform.

(a3) Fourier Transform of Binarized Image
The image obtained in the above step (a2) is subjected to Fourier transform using the same image processing program as described above (i.e., Non-destructive paper surface fiber orientation analysis program "FiberOri8single03" (www.enomae.com/FiberOri/index.htm).
FIG. 4 shows an image obtained from the FIG. 3 binarized image through Fourier-transform.

Figure 5:
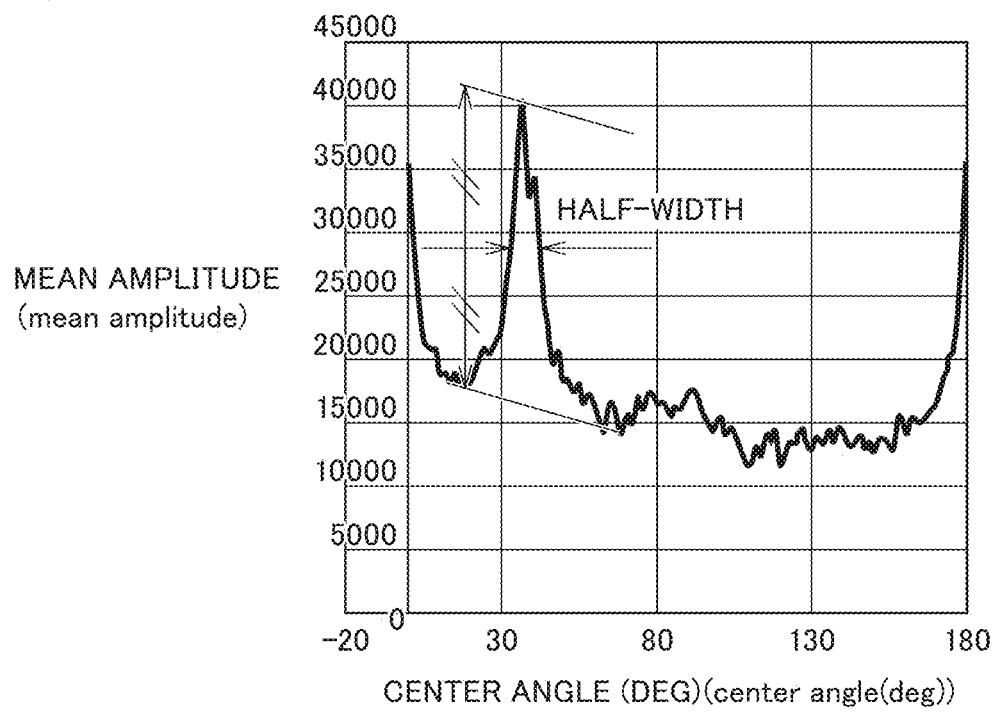
FIG. 5 is a graph showing a relationship between degree of orientation and intensity of orientation obtained from the FIG. 4. Fourier-transformed image.

(a4) Calculating Degree of Orientation and Intensity of Orientation
In the Fourier-transformed image, with the X-axis having a positive direction represented as 0°, an average amplitude with respect to counterclockwise angle (θ°) is calculated.
FIG. 5 is a graph showing a relationship between degree of orientation and intensity of orientation obtained from the FIG. 4 Fourier transformed image.

(a5) Measuring Half Width
Based on the graph of FIG. 5, a full width at half maximum (FWHM) is measured.

(a6) Calculating Degree of Orientation
Based on the full width at half maximum, degree of orientation is calculated using the following equation (1).

$$\text{degree of orientation} = (180° - \text{full width at half maximum})/180° \qquad (1)$$

A degree of orientation of 0 means being fully non-oriented. A degree of orientation of 1 means being fully oriented.

The carbon nanotube assembled wire in accordance with the present embodiment has a plurality of carbon nanotubes oriented at a degree of orientation of 0.9 or more and 1 or less. This means that the CNT assembled wire of the present embodiment has the plurality of CNTs highly oriented. Thus, the CNT assembled wire in accordance with the present embodiment can be elongated while maintaining the CNT's characteristics in electrical conductivity and mechanical strength.

When the CNT assembled wire has CNTs with a degree of orientation of less than 0.9, the CNT assembled wire tends to be reduced in electrical conductivity and mechanical strength. The lower limit value for the degree of orientation is preferably 0.93, more preferably 0.94, and still more preferably 0.95. The upper limit value for the degree of orientation is preferably 0.99, and more preferably 1. The degree of orientation of the CNT is 0.9 or more and 1 or less, preferably 0.93 or more and 1 or less, more preferably 0.94 or more and 1 or less, and still more preferably 0.95 or more and 1 or less. The degree of orientation of CNT is preferably 0.93 or more and 0.99 or less, more preferably 0.94 or more and 0.99 or less, and still more preferably 0.95 or more and 0.99 or less.

(Shape)

The carbon nanotube assembled wire has the shape of a yarn in which the plurality of carbon nanotubes are oriented and assembled together in their longitudinal direction.

The length of the carbon nanotube assembled wire is not particularly limited, and can be adjusted as appropriate depending on the application. The length of the CNT assembled wire is preferably 100 μm or more, more preferably 1000 μm or more, and further preferably 10 cm or more, for example. Although the upper limit value for the length of the CNT assembled wire is not particularly limited, it is preferably 1 m or less from the viewpoint of manufacturing. The length of the CNT assembled wire can be measured through observation with a scanning electron microscope, an optical microscope, or visual observation.

The size of the diameter of the carbon nanotube assembled wire is not particularly limited, and can be adjusted as appropriate depending on the application. The diameter of the CNT assembled wire is preferably 0.1 μm or more, and further preferably 1 μm or more, for example. Although the upper limit value for the diameter of the CNT assembled wire is not particularly limited, it is preferably 100 μm or less from the viewpoint of manufacturing. In the present embodiment, the size of the diameter of the CNT assembled wire is smaller than the length of the CNT assembled wire. That is, the direction of the length of the CNT assembled wire corresponds to the longitudinal direction.

In the present specification, the diameter of the carbon nanotube assembled wire means an average outer diameter of a single CNT assembled wire. The average outer diameter of a single CNT assembled wire is obtained by observing cross sections at two arbitrary positions of the single CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters.

(Elements Originating from Catalyst)

Preferably, the carbon nanotube assembled wire includes at least one type of metal element selected from the group consisting of iron, nickel, cobalt, molybdenum, gold, silver, copper, yttrium, chromium, palladium, platinum and tungsten, and the metal element is dispersed in the carbon nanotube assembled wire in the longitudinal direction thereof. Herein, the metal element dispersed in the CNT assembled wire in the longitudinal direction thereof means that the metal element is not localized in the CNT assembled wire in the longitudinal direction thereof.

These metal elements originate from a catalyst (such as nanoparticles consisting of ferrocene ($Fe(C_5H_5)_2$), nickelocene ($Ni(C_5H_5)_2$), cobaltocene $Co(C_5H_5)_2$, molybdenum, gold, silver, copper, yttrium, chromium, palladium, platinum, and tungsten) used in manufacturing the CNT assembled wire. In the CNT assembled wire in accordance with the present embodiment, these metal elements are present in the CNT assembled wire such that they are dispersed in the longitudinal direction of the CNT assembled wire, and the metal elements thus do not affect the CNT's characteristics in electrical conductivity. Therefore, the CNT assembled wire can be elongated while maintaining the CNT's inherent electrical conductivity.

What type of metal element is included in the CNT assembled wire and how much the former is contained in the latter can be confirmed and measured through energy dispersive X-ray spectrometry (EDX). A total content of the metal elements in the CNT assembled wire is preferably 0.1% or more and 50% or less, more preferably 1% or more and 40% or less, and still more preferably 5% or more and 20% or less based on atomicity.

The fact that the CNT assembled wire includes a metal element dispersed therein in the longitudinal direction thereof can be confirmed through EDX, electron energy loss spectrometry (EELS) or the like measurable at the same time as an electron microscope such as SEM and TEM.

The carbon nanotube assembled wire preferably has catalyst particles, and the catalyst particles preferably have an average particle diameter of 0.6 nm or more and less than 30 nm. The catalyst particles originate from a catalyst (nanoparticles or the like consisting of ferrocene ($Fe(C_5H_5)_2$), powdery iron oxide ($Fe_2O_3$), molybdenum, gold, silver, copper, yttrium, chromium, palladium, platinum and tungsten) used in manufacturing the CNT assembled wire. The CNT assembled wire in accordance with the present embodiment has catalyst particles which have an average particle diameter as small as less than 30 nm and are thus not coarsened, and hence do not affect the CNT's characteristic in electrical conductivity. Therefore, the CNT assembled wire can be elongated while maintaining the CNT's inherent electrical conductivity.

In the present specification, the "average particle diameter" of the catalyst particle means a median diameter (d50) in volume-based particle size distribution (volume distribution), and means an average particle diameter of all catalyst particles contained in the CNT assembled wire. It should be noted that, in the present specification, the "average particle diameter" may simply be referred to as a "particle diameter."

The particle diameter of each particle for calculating the particle diameter (volume average particle diameter) of catalyst particles included in the CNT assembled wire can be measured in the following method. Initially, any region (a measurement field of view: 0.5 μm×0.5 μm) of the carbon nanotube assembled wire is observed using a transmission electron microscope (TEM) with a magnification of 100,000 to 500,000 times. Subsequently, in the TEM image, an outer diameter, which is a distance between farthest two points on the outer circumference of each catalyst particle, is measured, and an average value of the obtained outer diameters is calculated.

The catalyst particles included in the CNT assembled wire can include at least one type of metal element selected from the group consisting of iron, nickel, cobalt, molybdenum, gold, silver, copper, yttrium, chromium, palladium, platinum, and tungsten. Herein, the catalyst particle including a metal element means both a case where the catalyst particle includes the metal element and another element (for example, sulfur, oxygen, etc.) together, and a case where the catalyst particle is composed of the metal element alone.

The catalyst particles included in the CNT assembled wire preferably include iron. In this case, the catalyst particles can be formed for example of iron particles made of iron alone, or iron sulfide ($FeS$, $Fe_2S$), iron oxide ($Fe_2O_3$, $Fe_3O_4$). The catalyst particles are more preferably iron particles made of iron. Using iron as a catalyst is suitable from a viewpoint of mass production of CNTs. Therefore, when the catalyst particles include iron, elongate CNT assembled wires can be mass-produced.

What composition the catalyst particles included in the CNT assembled wire have and how much the former is contained in the latter can be confirmed through energy dispersive X-ray spectrometry (EDX). A total content of the catalyst particles in the CNT assembled wire is preferably 0.01% or more and 50% or less, more preferably 0.5% or more and 40% or less, and still more preferably 0.1% or more and 20% or less on a mass basis.

Preferably, the carbon nanotube assembled wire includes the element of sulfur, and the element of sulfur is dispersed in the carbon nanotube assembled wire in the longitudinal direction thereof. Herein, the element of sulfur dispersed in the CNT assembled wire in the longitudinal direction thereof means that the element of sulfur is not localized in the CNT assembled wire in the longitudinal direction thereof.

The element of sulfur originates from an assistive catalyst ($CS_2$) used in manufacturing the CNT assembled wire. The CNT assembled wire in accordance with the present embodiment includes the element of sulfur such that it is dispersed in the CNT assembled wire in the longitudinal direction thereof, so that the element of sulfur does not affect the CNT's characteristics in electric conductivity and mechanical strength, and the CNT assembled wire can be elongated while maintaining these characteristics.

The fact that the CNT assembled wire includes the element of sulfur, and the content of the element of sulfur in the CNT assembled wire can be confirmed and measured through EDX, thermogravimetry, and X-ray photoelectron spectroscopy.

The content of the element of sulfur in the CNT assembled wire is preferably 0.1% or more and 20% or less, more preferably 1% or more and 15% or less, and still more preferably 2% or more and 10% or less based on atomicity.

The fact that the CNT assembled wire includes the element of sulfur dispersed therein in the longitudinal direction thereof can be confirmed by EDX, EELS or the like measurable at the same time as an electron microscope such as SEM and TEM.

<Carbon Nanotube>
(Shape of Carbon Nanotube)

The carbon nanotube can be a CNT of a known structure. Examples of the carbon nanotube that can be used include a single-layer carbon nanotube in which only a single carbon layer (graphene) has a cylindrical shape, a double-layer carbon nanotube or a multilayer carbon nanotube in which a stacked body of a plurality of carbon layers has a cylindrical shape, a cup stack-type nanotube having a structure in which graphenes in the shape of a bottomless paper cup are stacked, and the like.

Figure 6:
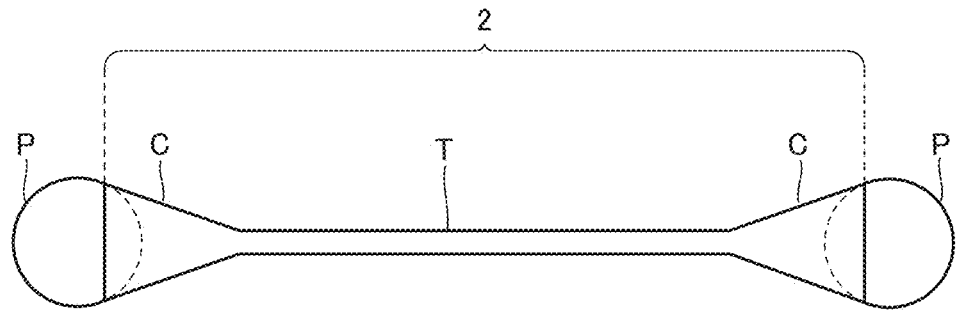
FIG. 6 is a view showing an example of a carbon nanotube used in one embodiment of the present disclosure.

The shape of the carbon nanotube is not particularly limited, and both a carbon nanotube having closed ends and a carbon nanotube having opened ends can be used. Further, as shown in FIG. 6, carbon nanotube 2 may gave a tube portion T having one or both ends with a catalyst particle P, which is used in producing the carbon nanotube, adhering thereto. In addition, a cone portion C made of a conical graphene may be formed at one end or both ends of tube portion T of carbon nanotube 2.

The length of the carbon nanotube can be selected as appropriate depending on the application. The length of the carbon nanotube is preferably 10 μm or more, and further preferably 100 μm or more, for example. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

The diameter of the carbon nanotube is preferably 0.6 nm or more and 20 nm or less, and further preferably 1 nm or more and 10 nm or less. In particular, when the diameter of the carbon nanotube is 1 nm or more and 10 nm or less, such a diameter is suitable from the viewpoint of heat resistance under oxidizing conditions.

In the present specification, the diameter of the carbon nanotube means an average outer diameter of one CNT. The CNT's average outer diameter is obtained by directly observing cross sections at two arbitrary positions of the CNT with a transmission electron microscope, measuring, in each cross section, an outer diameter, which is the distance between farthest two points on the outer circumference of the CNT, and calculating an average value of the obtained outer diameters. When the CNT includes a cone portion at one end or both ends thereof, the diameter is measured at a location other than the cone portion.

(D/G Ratio)

The carbon nanotube preferably has a D/G ratio of 0.1 or less, the D/G ratio being a ratio of a peak intensity of a D band to a peak intensity of a G band in a Raman spectroscopic analysis with a wavelength of 532 nm.

The G band is a peak originating in the CNT seen in the vicinity of a Raman shift of 1590 $cm^{-1}$ in a Raman spectrum obtained through Raman spectroscopy. The D band is a peak originating in amorphous carbon or a defect in graphite or the CNT seen in the vicinity of a Raman shift of 1350 $cm^{-1}$ in the Raman spectrum obtained through Raman spectroscopy. Therefore, as the D/G ratio has a smaller value, the carbon nanotube has a higher crystallinity, and the carbon nanotube contains a smaller amount of amorphous carbon or defective graphite.

A CNT having a D/G ratio of 0.1 or less has little amorphous carbon or defective graphite, and hence has high crystallinity. Thus, the CNT can have high tensile strength and high electrical conductivity. If the D/G ratio of the CNT exceeds 0.1, the CNT may be unable to have sufficient tensile strength and high electrical conductivity. The D/G ratio is preferably 0.1 or less, and more preferably 0.01 or less. Although the lower limit value for the D/G ratio is not particularly limited, it can be 0 or more, for example.

In the present specification, the D/G ratio of each carbon nanotube in the carbon nanotube assembled wire is a value measured in the following method.

The carbon nanotube assembled wire is subjected to Raman spectroscopic analysis under the following conditions to obtain a Raman spectrum (hereinafter also referred to as the Raman spectrum of the CNT assembled wire). A D/G ratio is calculated from a peak intensity of the D band and a peak intensity of the G band in the Raman spectrum of the CNT assembled wire. The D/G ratio of the CNT assembled wire is regarded as the D/G ratio of each carbon nanotube in the carbon nanotube assembled wire.
Measurement Conditions for Raman Spectroscopic Analysis
Wavelength: 532 nm
Laser power: 17 mW
Exposure time: one second
Average number of times: three times
Magnification of objective lens: 50 times The reason for regarding that the D/G ratio of each CNT in the CNT assembled wire in accordance with the present embodiment is the same as the D/G ratio of the CNT assembled wire is as follows:

The present inventors subjected a plurality of carbon nanotubes before being assembled together to Raman spectroscopic analysis under the same conditions as those described above to obtain a Raman spectrum (hereinafter also referred to as a CNT Raman spectrum). A D/G ratio was calculated from a peak intensity of the D band and a peak intensity of the G band in each of a plurality of obtained CNT Raman spectra.

Subsequently, the carbon nanotubes were assembled together to prepare a CNT assembled wire. The CNT assembled wire was subjected to a Raman spectroscopic analysis under the above conditions to obtain a Raman spectrum (hereinafter also referred to as a Raman spectrum of the CNT assembled wire). A D/G ratio was calculated from a peak intensity of the D band and a peak intensity of the G band in the Raman spectrum of the CNT assembled wire.

It has been confirmed that a value obtained by averaging data in D/G ratio of the plurality of carbon nanotubes before being assembled together, as calculated above, is substantially equal to that of the D/G ratio of the CNT assembled wire. This indicates that the D/G ratio of the carbon nanotubes before being assembled together is maintained in the CNTs in the CNT assembled wire. Therefore, in the present specification, the D/G ratio of each carbon nanotube in the CNT assembled wire can be regarded as the same as the D/G ratio of the CNT before being assembled together.

Embodiment 2: Carbon Nanotube Assembled Wire Bundle

Figure 7:
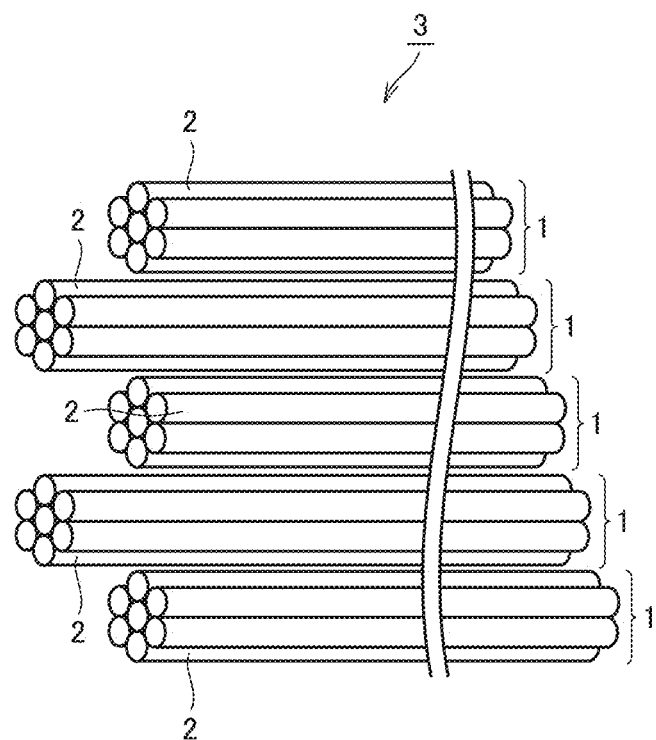
FIG. 7 is a view for illustrating a typical exemplary configuration of a carbon nanotube assembled wire bundle in accordance with one embodiment of the present disclosure.

FIG. 7 is a view for illustrating a typical exemplary configuration of a carbon nanotube assembled wire bundle in accordance with one embodiment of the present disclosure. As shown in FIG. 7, the carbon nanotube assembled wire bundle (hereinafter also referred to as a CNT assembled wire bundle) 3 in accordance with the present embodiment includes a plurality of carbon nanotube assembled wires 1. Carbon nanotube assembled wire 1 has carbon nanotube 2 oriented at a degree of orientation of 0.9 or more and 1 or less, and carbon nanotube assembled wire bundle 3 includes an oriented region in which carbon nanotube assembled wire 1 is oriented at a degree of orientation of 0.8 or more and 1 or less.

(Configuration of Carbon Nanotube Assembled Wire Bundle)

As carbon nanotube assembled wire 1 constituting carbon nanotube assembled wire bundle 3, the CNT assembled wire of Embodiment 1 can be used. As carbon nanotube 2 constituting CNT assembled wire 1, the same carbon nanotube as that described in Embodiment 1 can be used.

(Degree of Orientation)

The degree of orientation of the CNT in the carbon nanotube assembled wire has a value calculated in a method similar to the method described in Embodiment 1 for calculating the degree of orientation of the carbon nanotube in the carbon nanotube assembled wire, and accordingly, will not be described repeatedly.

The degree of orientation of the CNT assembled wire in the carbon nanotube assembled wire bundle is basically a value calculated through a procedure similar to that of steps (a1) to (a6) described in Embodiment 1 for a method for calculating a degree of orientation. What is different is that, in step (a1), the CNT assembled wire bundle is imaged using the following equipment under the following conditions.

Scanning electron microscope (SEM): Cry-10 (product name) manufactured by Technex Lab Co., Ltd.

Figure 8:
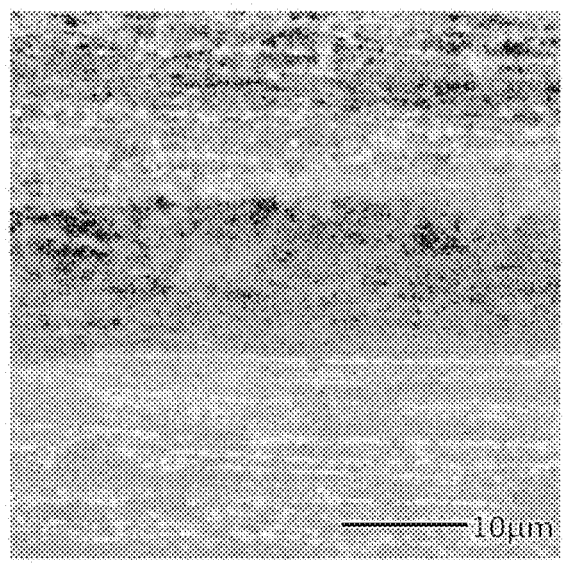
FIG. 8 is an image of an example of a CNT assembled wire bundle via a scanning electron microscope (SEM) in accordance with the present embodiment.

Imaging condition: a magnification of 40 to 100,000 times, and an acceleration voltage of 1 kV to 17 k Measurement field of view: 30 μm×30 μm FIG. 8 shows an SEM image of an example of the CNT assembled wire bundle in accordance with the present embodiment, as imaged under the above conditions.

Figure 9:
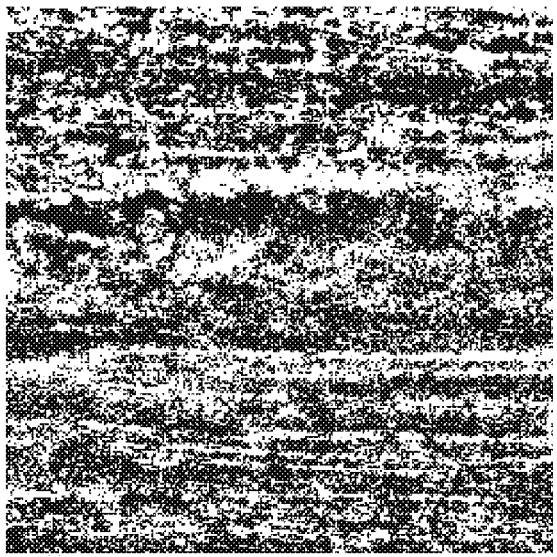
FIG. 9 is an image obtained by binarizing the FIG. 8 SEM image.
Figure 10:
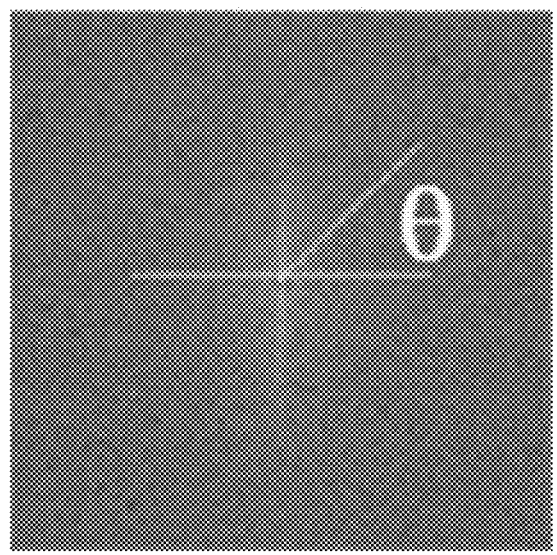
FIG. 10 is an image obtained by subjecting the FIG. 9 binarized image to Fourier-transform.

FIG. 9 shows an image obtained by binarizing the FIG. 8 SEM image in step (a2). FIG. 10 shows an image obtained by subjecting the FIG. 9 binarized image to Fourier transform in step (a3).

Figure 11:
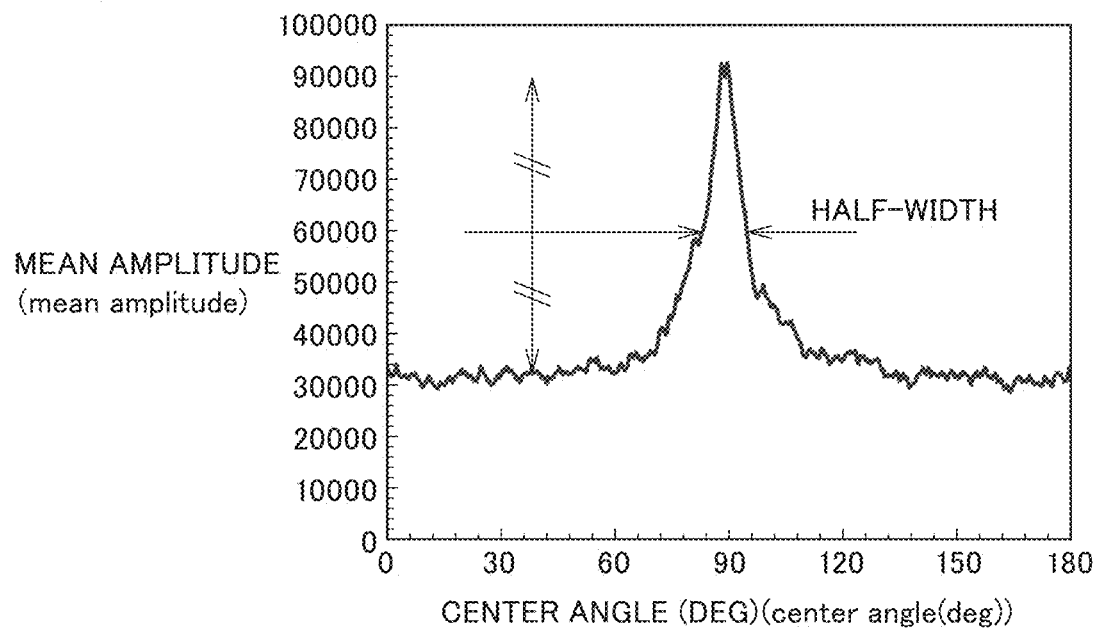
FIG. 11 is a graph showing a relationship between degree of orientation and intensity of orientation obtained from the FIG. 10. Fourier-transformed image.

FIG. 11 is a graph showing a relationship between degree of orientation and intensity of orientation obtained from the FIG. 10 Fourier transformed image in step (a4).

In step (a5), a full width at half maximum is measured based on the graph of FIG. 11. In step (a6), based on the full width at half maximum, degree of orientation is calculated by the following equation (1).

$$\text{degree of orientation} = (180° - \text{full width at half maximum})/180° \quad (1)$$

A degree of orientation of 0 means being fully non-oriented. A degree of orientation of 1 means being fully oriented.

The above measurement is performed at ten or more arbitrarily selected measurement fields of view. When one or more of the all of the measurement fields of view show that the carbon nanotube assembled wire bundle has the carbon nanotube assembled wires with a degree of orientation of 0.8 or more and 1 or less, it is determined that the carbon nanotube assembled wire bundle includes an oriented region in which the carbon nanotube assembled wires are oriented at a degree of orientation of 0.8 or more and 1 or less.

The carbon nanotube assembled wire bundle in accordance with the present embodiment is composed of carbon nanotube assembled wires composed of carbon nanotubes oriented at a degree of orientation of 0.9 or more and 1 or less, and the carbon nanotube assembled wire bundle includes an oriented region in which the carbon nanotube assembled wires are oriented at a degree of orientation of 0.8 or more and 1 or less. This means that the CNT assembled wire bundle of the present embodiment has the CNTs and CNT assembled wires highly oriented. Thus, the CNT assembled wire bundle in accordance with the present embodiment can be elongated while maintaining the CNT's characteristics in electrical conductivity and mechanical strength.

When the CNT assembled wire has CNTs with a degree of orientation of less than 0.9, the CNT assembled wire tends to be reduced in electrical conductivity and mechanical strength. The lower limit value for the degree of orientation is 0.9, preferably 0.93, more preferably 0.94, and still more preferably 0.95. The upper limit value for the degree of orientation is preferably 0.99, and more preferably 1.

When the CNT assembled wire bundle has CNT assembled wires with a degree of orientation of less than 0.8, the CNT assembled wire bundle tends to be reduced in electrical conductivity and mechanical strength. The lower limit value for the degree of orientation is 0.8, preferably 0.83, and more preferably 0.85. The upper limit value for the degree of orientation is preferably 0.95, and more preferably 1.

(Shape)

The carbon nanotube assembled wire bundle has the shape of a string in which a plurality of carbon nanotube assembled wires are oriented and assembled together in their longitudinal direction. The fact that the carbon nanotube assembled wire bundle has the shape of a string in which a plurality of carbon nanotube assembled wires are oriented and assembled together in their longitudinal direction can be confirmed by observation with an optical microscope or a scanning electron microscope.

The length of the carbon nanotube assembled wire bundle is not particularly limited, and can be adjusted as appropriate depending on the application. The length of the CNT assembled wire bundle is preferably 100 µm or more, more preferably 1000 µm or more, and further preferably 10 cm or more, for example. Although the upper limit value for the length of the CNT assembled wire bundle is not particularly limited, it is preferably 1 m or less from the viewpoint of manufacturing. The length of the CNT assembled wire bundle can be measured through observation with an optical microscope or visual observation.

The size of the diameter of the carbon nanotube assembled wire bundle is not particularly limited, and can be adjusted as appropriate depending on the application. The diameter of the CNT assembled wire bundle is preferably 1 µm or more, and further preferably 10 µm or more, for example. Although the upper limit value for the diameter of the CNT assembled wire bundle is not particularly limited, it is preferably 1000 µm or less from the viewpoint of manufacturing. In the present embodiment, the size of the diameter of the CNT assembled wire bundle is smaller than the length of the CNT assembled wire bundle.

In the present specification, the diameter of the carbon nanotube assembled wire bundle means an average outer diameter of a single CNT assembled wire bundle. The average outer diameter of a single CNT assembled wire bundle is obtained by observing cross sections at two arbitrary positions of the single CNT assembled wire bundle with an optical microscope, measuring, in each cross section, an outer diameter, which is the distance between farthest two points on the outer circumference of the CNT assembled wire bundle, and calculating an average value of the obtained outer diameters.

(Oriented Region and Amorphous Region)

Figure 12:
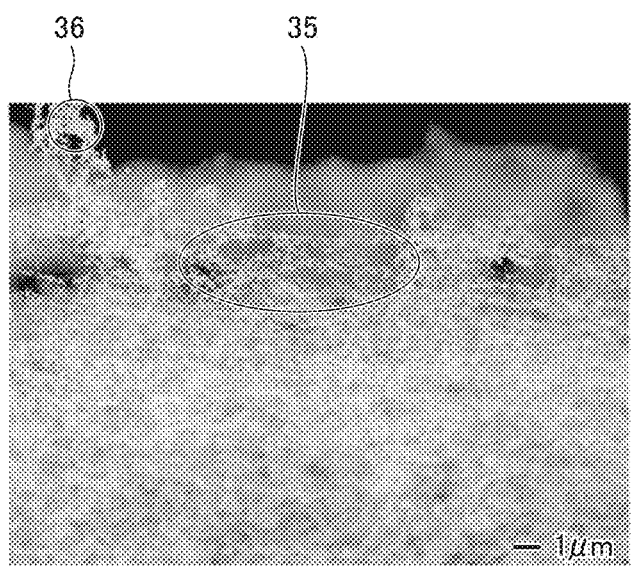
FIG. 12 is a SEM image of one example of a carbon nanotube assembled wire bundle in accordance with one embodiment of the present disclosure.

FIG. 12 is a SEM image of a carbon nanotube assembled wire bundle in accordance with one embodiment of the present disclosure. As shown in FIG. 12, the carbon nanotube assembled wire bundle can include an oriented region 35 and an amorphous region 36 in which the carbon nanotube assembled wire has a degree of orientation of 0 or more and less than 0.8. In the present specification, the oriented region means a region in which the CNT assembled wire bundle has CNT assembled wires with a degree of orientation of 0.8 or more and 1.0 or less. On the other hand, the amorphous region means a region in which the CNT assembled wire bundle has CNT assembled wires with a degree of orientation of 0 or more and less than 0.8. As the CNT assembled wire bundle includes an orientated region and an amorphous region, a buffering function against bending or twisting can be added as desired while adjacent CNT assembled wires do not bond to each other.

A proportion of the oriented region in the carbon nanotube assembled wire bundle is preferably 50% by volume or more and less than 100% by volume. Thus, in the carbon nanotube assembled wire bundle, the CNT assembled wire can have a sufficient degree of orientation. The proportion of the oriented region in the CNT assembled wire bundle is more preferably 60% by volume or more and 99% by volume or less, and still more preferably 70% by volume or more and 99% by volume or less.

A proportion of the amorphous region in the carbon nanotube assembled wire bundle is preferably larger than 0% by volume and 50% by volume or less. Thus, in the carbon nanotube assembled wire bundle, the CNT assembled wire can have a sufficient degree of orientation. The proportion of the amorphous region in the CNT assembled wire bundle is more preferably 1% by volume or more and 40% by volume or less, and still more preferably 1% by volume or more and 30% by volume or less.

A proportion of the oriented region and that of the amorphous region in the carbon nanotube assembled wire bundle is a value calculated through the following procedure of steps (b1) to (b3).

(b1) Setting a Measurement Field of View

On a surface of the carbon nanotube assembled wire bundle, a rectangular field of view of 1 mm×1 mm for measurement is selected randomly at 10 locations or more.

(b2) Measuring Degree of Orientation

For each of the ten or more measurement fields of view set in step (b1), a degree of orientation of the CNT assembled wires in the CNT assembled wire bundle is calculated through a procedure similar to that followed in measuring a degree of orientation of CNT assembled wires in a CNT assembled wire bundle, as described above.

(b3) Calculating a Proportion

A proportion of an oriented region in the CNT assembled wire bundle can be obtained by calculating a proportion of the number of measurement fields of view that show a degree of orientation of 0.8 or more and 1.0 or less (i.e., the oriented region) out of the ten or more measurement fields of view. In addition, a proportion of an amorphous region in the CNT assembled wire bundle can be obtained by calculating a proportion of the number of measurement fields of view that show a degree of orientation of 0 or more and less than 0.8 (i.e., the amorphous region) out of the ten or more measurement fields of view.

(Distance Between Carbon Nanotube Assembled Wires)

Preferably, in at least a portion of the oriented region of the CNT assembled wire bundle of the present embodiment, a minimum value of a distance between adjacent ones of the plurality of carbon nanotube assembled wires is preferably 10 times or more an average diameter of the plurality of carbon nanotube assembled wires. According to this, a buffering function against bending or twisting can be added as desired while adjacent carbon nanotube assembled wires do not bond to each other.

Figure 13:
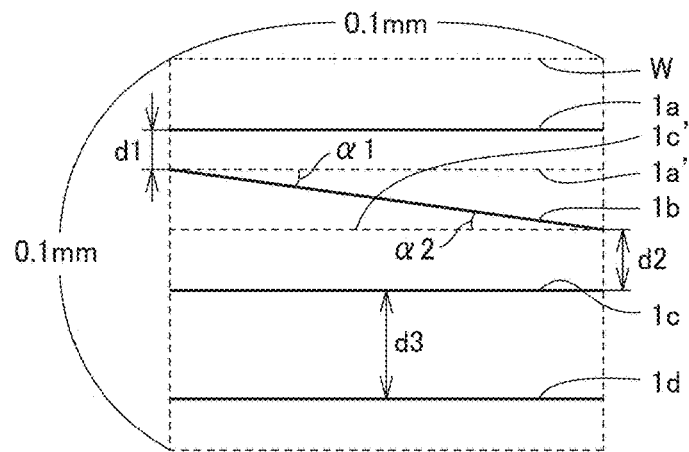
FIG. 13 is a diagram schematically showing an oriented region of a CNT assembled wire bundle in accordance with an embodiment of the present disclosure.

A method for measuring a distance between adjacent CNT assembled wires in the oriented region of the CNT assembled wire bundle in the present specification will now be described with reference to FIG. 13. FIG. 13 is a diagram schematically showing an example of an oriented region of a CNT assembled wire bundle in accordance with an embodiment of the present disclosure. In the present specification, a distance between CNT assembled wires can be confirmed through the following procedure of steps (c1) and (c2).

(c1) Setting a Measurement Field of View

One oriented region is arbitrarily selected from oriented regions observed through steps (b1) to (b3), and a field of view of a square of 0.1 mm×0.1 mm for measurement is set in the selected oriented region. When setting the measurement field of view, at least one side of a square that is the peripheral frame of the measurement field of view is set to be substantially parallel to at least one of the carbon nanotube assembled wires. For example, in FIG. 13, a carbon nanotube assembled wire 1a and one side W of the square are parallel to each other. Herein, being substantially parallel means that a specific carbon nanotube assembled wire and one side of a rectangle form an angle of 5° or less.

(c2) Measuring a Distance Between Adjacent Carbon Nanotube Assembled Wires

In the measurement field of view set in step (c1), a distance between adjacent carbon nanotube assembled wires is measured through observation with a scanning electron microscope. Herein, being between adjacent carbon nanotube assembled wires means being between a specific carbon nanotube assembled wire and a carbon nanotube assembled wire present closest to the specific carbon nanotube assembled wire.

For example, a CNT assembled wire adjacent to carbon nanotube assembled wire 1a shown in FIG. 13 is a carbon nanotube assembled wire 1b, and a minimum value of the distance between CNT assembled wire 1a and CNT assembled wire 1b is d1. A CNT assembled wire adjacent to a carbon nanotube assembled wire 1c is carbon nanotube assembled wire 1b, and a minimum value of the distance between CNT assembled wire 1c and CNT assembled wire 1b is d2. A CNT assembled wire adjacent to a carbon nanotube assembled wire 1d is carbon nanotube assembled wire 1c, and a minimum value of the distance between CNT assembled wire 1d and CNT assembled wire 1c is d3.

(Comparing Distance Between CNT Assembled Wires with Average Diameter of CNT Assembled Wires)

Lengths d1, d2 and d3 are measured, and a minimum value of these is determined. By comparing the minimum value with the average diameter of the plurality of carbon nanotube assembled wires, it can be confirmed whether the minimum value of the distances between adjacent ones of the plurality of carbon nanotube assembled wires is 10 times or more the average diameter of the plurality of carbon nanotube assembled wires in at least a portion of the oriented region of the CNT assembled wire bundle. Herein, the average diameter of the plurality of carbon nanotube assembled wires means an average diameter of the plurality of carbon nanotube assembled wires present in the measurement field of view set in step (c1).

In the present specification, the diameter of the carbon nanotube assembled wire means an average outer diameter of a single CNT assembled wire. The average outer diameter of each of CNT assembled wires 1a, 1b, 1c, 1d is obtained by directly observing cross sections at two arbitrary positions of each CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters. The average diameter of the plurality of carbon nanotube assembled wires in the measurement field or view is calculated from the average outer diameter of each of CNT assembled wires 1a, 1b, 1c, and 1d.

The minimum value of the distances between adjacent ones of the plurality of carbon nanotube assembled wires is preferably 10 times or more and 50 times or less, more preferably 15 times or more and 40 times or less, and still more preferably 20 times or more and 30 times or less of the average diameter of the plurality of carbon nanotube assembled wires. When the minimum value of the distances between adjacent ones of the plurality of carbon nanotube assembled wires exceeds 50 times the average diameter of the plurality of carbon nanotube assembled wires, many gaps result and accordingly, foreign matters are easily introduced, and when an external force is applied, stress concentration occurs in the vicinity of the foreign matters and the buffering function is reduced, and the carbon nanotube assembled wires may break.

(Angle Between Carbon Nanotube Assembled Wires)

In at least a portion of the oriented region of the CNT assembled wire bundle of the present embodiment, a maximum value of angles between adjacent carbon nanotube assembled wires is preferably 10° or less. According to this, a buffering function against bending or twisting can be added as desired while adjacent carbon nanotube assembled wires do not bond to each other.

In the present specification, the angle between adjacent carbon nanotube assembled wires in at least a portion of the oriented region of the CNT assembled wire bundle can be confirmed through the following procedure of steps (d1) and (d2).

(d1) Determining Measurement Field of View

A measurement field of view of a square of 0.1 mm×0.1 mm is determined in a manner similar to that in step (c1).

(d2) Measuring Angle Between Adjacent Carbon Nanotube Assembled Wires

In the field of view set in step (d1), an angle between adjacent carbon nanotube assembled wires is measured. Herein, being between adjacent carbon nanotube assembled wires means being between a specific carbon nanotube assembled wire and a carbon nanotube assembled wire present closest to the specific carbon nanotube assembled wire.

For example, a CNT assembled wire adjacent to carbon nanotube assembled wire 1a shown in FIG. 13 is carbon nanotube assembled wire 1b, and an angle between CNT assembled wire 1a and CNT assembled wire 1b, which is equal to an angle between a line 1a' parallel to CNT assembled wire 1a and CNT assembled wire 1b, is α1°. A CNT assembled wire adjacent to carbon nanotube assembled wire 1c is carbon nanotube assembled wire 1b, and an angle between CNT assembled wire 1c and CNT assembled wire 1b, which is equal to an angle between a line 1c' parallel to CNT assembled wire 1c and CNT assembled wire 1b, is α2°. A CNT assembled wire adjacent to carbon nanotube assembled wire 1c is carbon nanotube assembled wire 1d, and CNT assembled wire 1c and CNT assembled wire 1d are parallel to each other and form an angle of 0°.

When angles α1° and α2° have a maximum value of 10° or less, it is determined that an angle between adjacent carbon nanotube assembled wires is 10° or less in at least a portion of the oriented region of the CNT assembled wire bundle.

The angle between adjacent carbon nanotube assembled wires is preferably 10° or less, more preferably 9° or less, still more preferably 5° or less, and most preferably 0°.

(Elements Originating from Catalyst)

Preferably, the carbon nanotube assembled wire bundle includes at least one type of metal element selected from the group consisting of iron, nickel, cobalt, molybdenum, gold, silver, copper, yttrium, chromium, palladium, platinum and tungsten, and the metal element is dispersed in the carbon nanotube assembled wire bundle in the longitudinal direction thereof. Herein, the metal element dispersed in the CNT assembled wire bundle in the longitudinal direction thereof means that the metal element is not localized in the CNT assembled wire in the longitudinal direction thereof.

These metal elements originate from a catalyst (nanoparticles or the like consisting of ferrocene ($Fe(C_5H_5)_2$), nickelocene ($Ni(C_5H_5)_2$), cobaltocene $Co(C_5H_5)_2$, molybdenum, gold, silver, copper, yttrium, chromium, palladium, platinum and tungsten) used in manufacturing the CNT assembled wire bundle. In the CNT assembled wire bundle in accordance with the present embodiment, these metal elements are present in the CNT assembled wire bundle such that they are dispersed in the longitudinal direction of the CNT assembled wire bundle, and the metal elements thus do not affect the CNT's characteristics in electrical conductivity. Therefore, the CNT assembled wire bundle can be elongated while maintaining the CNT's inherent electrical conductivity.

What type of metal element is included in the CNT assembled wire bundle and how much the former is contained in the latter can be confirmed and measured through energy dispersive X-ray spectrometry (EDX). A total content of the metal element in the CNT assembled wire bundle is preferably 0.1% or more and 50% or less, more preferably 1% or more and 40% or less, and still more preferably 5% or more and 20% or less based on atomicity.

The fact that the CNT assembled wire bundle includes a metal element dispersed therein in the longitudinal direction thereof can be confirmed through EDX, electron energy loss spectrometry (EELS) or the like measurable at the same time as an electron microscope such as SEM and TEM.

The carbon nanotube assembled wire bundle preferably has catalyst particles, and the catalyst particles preferably have an average particle diameter of 0.6 nm or more and less than 30 nm. The catalyst particles originate from a catalyst (nanoparticles or the like consisting of ferrocene ($Fe(C_5H_5)_2$), powdery iron oxide ($Fe_2O_3$), molybdenum, gold, silver, copper, yttrium, chromium, palladium, platinum and tungsten) used in manufacturing the CNT assembled wire. The CNT assembled wire bundle in accordance with the present embodiment has catalyst particles which have an average particle diameter as small as less than 30 nm and are thus not coarsened, and hence do not affect the CNT's characteristic in electrical conductivity.

Therefore, the CNT assembled wire bundle can be elongated while maintaining the CNT's inherent electrical conductivity.

Herein, the definition of the "average particle diameter" of the catalyst particles is the same as the definition of the "average particle diameter" of the catalyst particles described in Embodiment 1, and accordingly, will not be described repeatedly.

The particle diameter of each particle for calculating the particle diameter (volume average particle diameter) of catalyst particles included in the CNT assembled wire bundle can be measured in the following method: Initially, any region (a measurement field of view: 0.5 μm×0.5 μm) of the carbon nanotube assembled wire bundle is observed using a transmission electron microscope (TEM) with a magnification of 100,000 to 500,000 times. Subsequently, in the TEM image, an outer diameter, which is a distance between farthest two points on the outer circumference of each catalyst particle, is measured, and an average value of the obtained outer diameters is calculated.

The catalyst particles included in the CNT assembled wire bundle can include at least one type of metal element selected from the group consisting of iron, nickel, cobalt, molybdenum, gold, silver, copper, yttrium, chromium, palladium, platinum, and tungsten. Herein, the catalyst particle including a metal element means both a case where the catalyst particle includes the metal element and another element (for example, sulfur, oxygen, etc.) together, and a case where the catalyst particle is composed of the metal element alone.

The catalyst particles included in the CNT assembled wire bundle preferably include iron. In this case, the catalyst particles can be formed for example of iron particles made of iron alone, or iron sulfide ($FeS$, $Fe_2S$), iron oxide ($Fe_2O_3$, $Fe_3O_4$). The catalyst particles are more preferably iron particles made of iron. Using iron as a catalyst is suitable from a viewpoint of mass production of CNTs. Therefore, when the catalyst particles include iron, elongate CNT assembled wire bundles can be mass-produced.

What composition the catalyst particles included in the CNT assembled wire bundle have and how much the former is contained in the latter can be confirmed through energy dispersive X-ray spectrometry (EDX). A total content of the catalyst particles in the CNT assembled wire bundle is preferably 0.01% or more and 50% or less, more preferably 0.5% or more and 40% or less, and still more preferably 0.1% or more and 20% or less on a mass basis.

Preferably, the carbon nanotube assembled wire bundle includes the element of sulfur, and the element of sulfur is dispersed in the carbon nanotube assembled wire bundle in the longitudinal direction thereof. Herein, the element of sulfur dispersed in the CNT assembled wire bundle in the longitudinal direction thereof means that the element of sulfur is not localized in the CNT assembled wire bundle in the longitudinal direction thereof.

The element of sulfur originates from an assistive catalyst ($CS_2$) used in manufacturing the CNT assembled wire bundle. The CNT assembled wire bundle in accordance with the present embodiment includes the element of sulfur such that it is dispersed in the CNT assembled wire bundle in the longitudinal direction thereof, so that the element of sulfur does not affect the CNT's characteristics in electric conductivity and mechanical strength, and the CNT assembled wire bundle can be elongated while maintaining these characteristics.

The fact that the CNT assembled wire bundle includes the element of sulfur, and the content of the element of sulfur in the CNT assembled wire bundle can be confirmed and measured through EDX, thermogravimetry, and X-ray photoelectron spectroscopy. The content of the element of sulfur in the CNT assembled wire bundle is preferably 0.1% or more and 20% or less, more preferably 1% or more and 15% or less, and still more preferably 2% or more and 10% or less based on atomicity.

The fact that the CNT assembled wire bundle includes the element of sulfur dispersed therein in the longitudinal direction thereof can be confirmed by EDX, EELS or the like measurable at the same time as an electron microscope such as SEM and TEM.

(Elongation at Break, Breaking Strength, Young's Modulus)

The carbon nanotube assembled wire bundle preferably has an elongation at break of 0.1% or more and a breaking strength of 1 GPa or more. According to this, the CNT assembled wire bundle can have excellent mechanical strength.

The lower limit for the elongation at break of the CNT assembled wire bundle is preferably 0.1% or more, more preferably 1% or more, and still more preferably 5% or more. While the upper limit for the elongation at break of the CNT assembled wire bundle is not particularly limited, it can for example be 50% or less. The elongation at break of the CNT assembled wire bundle is preferably 0.1% or more and 50% or less, more preferably 1% or more and 40% or less, and still more preferably 5% or more and 30% or less.

The lower limit for the breaking strength of the CNT assembled wire bundle is preferably 1 GPa or more, more preferably 3 GPa or more, and still more preferably 10 GPa or more. While the upper limit for the breaking strength of the CNT assembled wire bundle is not particularly limited, it can for example be 100 GPa or less. The breaking strength of the CNT assembled wire bundle is preferably 1 GPa or more and 100 GPa or less, more preferably 3 GPa or more and 50 GPa or less, and still more preferably 10 GPa or more and 30 GPa or less.

The carbon nanotube assembled wire bundle preferably has a Young's modulus of 10 GPa or more. According to this, the CNT assembled wire bundle can have excellent mechanical strength.

The lower limit for the Young's modulus of the CNT assembled wire bundle is preferably 10 GPa or more, more preferably 100 GPa or more, and still more preferably 300 GPa or more. While the upper limit for the Young's modulus of the CNT assembled wire bundle is not particularly limited, it is preferably 1500 GPa or less. The Young's modulus of the CNT assembled wire bundle is preferably 10 GPa or more and 1500 GPa or less, more preferably 100 GPa or more and 1200 GPa or less, and still more preferably 300 GPa or more and 1000 GPa or less.

The CNT assembled wire bundle's elongation at break, breaking strength, and Young's modulus are measured by performing a breaking test. The breaking test is conducted in the following method: A CNT assembled wire having a length of about 3 cm is prepared, and has its opposite ends fixed to a tensile jig plate with an adhesive. One end of the jig plate with the CNT assembled wire fixed thereto is pulled, and tensile stress and elongation are measured until a 1 cm of the CNT assembled wire which is not fixed with the adhesive breaks (measurement instrument used: load-displacement measurement unit (FSA-1KE-5N) manufactured by IMADA Co., Ltd.). Thus, a stress-strain curve is obtained. The Young's modulus is evaluated from a slope of the stress-strain curve in a linear region during an initial deformation process.

(First Element Content)

The carbon nanotube assembled wire bundle preferably includes 10% by mass or less of at least one type of a first element selected from the group consisting of iron, sulfur, nickel, cobalt, molybdenum, gold, silver, copper, yttrium, chromium, palladium, platinum, and tungsten in total.

When the total content of the first element exceeds 10% by mass, composite particles including the first element tend to be easily formed. If the CNT assembled wire bundle includes composite particles, the CNT assembled wire bundle tends to have a decreased breaking strength. Thus, when the total content of the first element in the CNT assembled wire bundle is 10% by mass or less, the CNT assembled wire bundle can suppress reduction in breaking strength caused by formation of composite particles, and the CNT assembled wire bundle can have excellent mechanical strength.

The upper limit for the total content of the first element in the CNT assembled wire bundle is preferably 10% by mass or less, more preferably 5% by mass or less, and still more preferably 1% by mass or less. While the lower limit for the total content of the first element in the CNT assembled wire bundle is not particularly limited, it can be 0.01% by mass or more from the viewpoint of manufacturing. The total content of the first element in the CNT assembled wire bundle is preferably 0.01% by mass or more and 10% by mass or less, more preferably 0.05% by mass or more and 5% by mass or less, and still more preferably 0.1% by mass or more and 1% by mass or less.

The total content of the first element in the CNT assembled wire bundle can be measured through energy dispersive X-ray spectrometry (EDX).

Embodiment 3-1: Method for Manufacturing Carbon Nanotube Assembled Wire (1)

A method for manufacturing a carbon nanotube assembled wire in accordance with Embodiment 3-1 is a method for manufacturing a carbon nanotube assembled wire in accordance with Embodiment 1. The method for manufacturing a carbon nanotube assembled wire in accordance with Embodiment 3-1 can include: supplying a carbon-containing gas to a plurality of suspended catalyst particles to grow one or more carbon nanotubes from each of the plurality of catalyst particles (hereinafter also referred to as a growing step); applying a tensile force to a plurality of suspended carbon nanotubes to draw the plurality of carbon nanotubes (hereinafter also referred to as a drawing step); and orienting and assembling the plurality of suspended carbon nanotubes together in a direction along the flow of the carbon-containing gas to obtain a carbon nanotube assembled wire (hereinafter also referred to as an assembling step).

Figure 14:
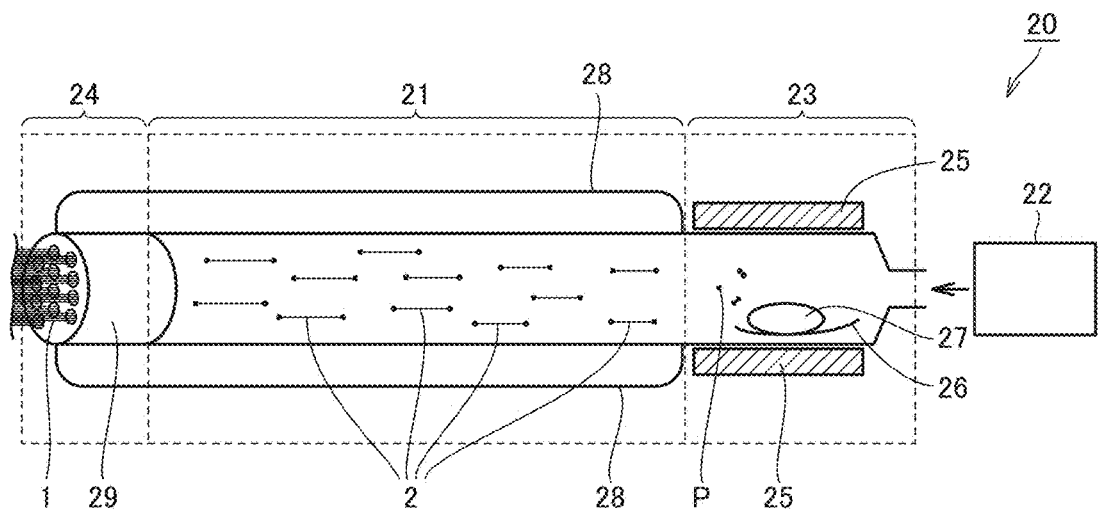
FIG. 14 is a view for illustrating a typical exemplary configuration of a carbon nanotube assembled wire manufacturing apparatus in accordance with one embodiment of the present disclosure.

The carbon nanotube assembled wire in accordance with Embodiment 1 can be manufactured by, for example, a carbon nanotube assembled wire manufacturing apparatus 20 shown in FIG. 14. Carbon nanotube assembled wire manufacturing apparatus 20 can include: a tubular carbon nanotube growing unit (hereinafter also referred to as a CNT growing unit) 21; a gas supplying unit 22 that supplies a carbon-containing gas into CNT growing unit 21 from one end of CNT growing unit 21 (in FIG. 14, a right end thereof); a catalyst supplying unit 23 that supplies catalyst particles P into CNT growing unit 21; and a carbon nanotube assembling unit 24 (hereinafter also referred to as a CNT assembling unit) that is disposed at the other end of CNT growing unit 21 (in FIG. 14, a left end thereof) and orients and assembles a plurality of carbon nanotubes that are obtained in CNT growing unit 21 together in a direction along a flow of the carbon-containing gas.

<Growing Step>

In a growing step, by supplying the carbon-containing gas to a plurality of catalyst particles in a suspended state, one or more carbon nanotubes are grown from each of the plurality of catalyst particles. In the present specification, in the growing step, the CNT has a length of 20 µm or less.

The growing step is performed inside CNT growing unit 21. The growing step is preferably performed at a temperature of 800° C. or more and 1200° C. or less. If the temperature is less than 800° C., CNTs tend to be grown at a slower rate. On the other hand, when the temperature exceeds 1200° C., content of impurity carbon tends to increase. Herein, impurity carbon means a carbon material other than CNT. Examples thereof include amorphous carbon and microcrystal of graphite. The growing step is performed under a condition in temperature of more preferably 900° C. or more and 1150° C. or less, and still more preferably 950° C. or more and 1050° C. or less.

By wind pressure of the carbon-containing gas supplied from gas supplying unit 22 to catalyst supplying unit 23 and CNT growing unit 21, a catalyst 27 disposed inside catalyst supplying unit 23 is disintegrated and thus becomes catalyst particles P, and catalyst particles P are supplied into CNT growing unit 21.

Examples of catalyst particles P include iron, nickel, cobalt, molybdenum, gold, silver, copper, palladium, and platinum. Inter alia, iron is preferably used from the viewpoint of mass production of elongate CNTs.

The carbon-containing gas is supplied from gas supplying unit 22 to CNT growing unit 21 via catalyst supplying unit 23. As the carbon-containing gas, a reducing gas such as hydrocarbon gas is used. As such a carbon-containing gas, for example, a gaseous mixture of methane and argon, a gaseous mixture of ethylene and argon, a gaseous mixture of ethanol and argon, or the like can be used. The carbon-containing gas preferably includes carbon disulfide ($CS_2$) as an assistive catalyst.

The lower limit for the average flow velocity in the CNT growing unit of the carbon-containing gas supplied from gas supplying unit 22 is 0.05 cm/sec, preferably 0.10 cm/sec, and more preferably 0.20 cm/sec. On the other hand, the upper limit for the average flow velocity in CNT growing unit 21 is preferably 10.0 cm/sec, more preferably 5.0 cm/sec. If the average flow velocity of the carbon-containing gas in CNT growing unit 21 is less than the lower limit, a carbon source gas supplied to catalyst particles P is insufficiently supplied, and carbon nanotubes formed between catalyst particles P tend to grow stagnantly. On the contrary, if the average flow velocity of the carbon-containing gas in CNT growing unit 21 exceeds the upper limit, this tends to detach carbon nanotubes from catalyst particles P, which stops growth of the carbon nanotubes and consequently inhibits formation of carbon nanotubes.

The lower limit of the Reynolds number of the flow in CNT growing unit 21 of the carbon-containing gas supplied from gas supplying unit 22 is preferably 0.01, and more preferably 0.05. On the other hand, the upper limit for the Reynolds number is 1000, preferably 100, and more preferably 10. If the Reynolds number is less than the lower limit, the apparatus is excessively restricted in design, which may make carbon nanotube assembled wire manufacturing apparatus 20 unnecessarily expensive and tends to unnecessarily lower efficiency of manufacturing carbon nanotubes. A Reynolds number exceeding the upper limit tends to disturb flow of the carbon-containing gas and inhibit production of carbon nanotubes on catalyst particles P.

The length of the CNT obtained through the growing step is preferably 0.1 μm or more and 20 μm or less. If the length of the CNT obtained through the growing step is less than 0.1 μm, adjacent CNTs would not be oriented in the longitudinal direction and instead entangled, and tend to form secondary particles. On the other hand, when the length of the CNT exceeds 20 μm, a period of time before a drawing step is performed is increased, which tends to unnecessarily decrease efficiency of manufacturing the carbon nanotube. The length of the CNT obtained through the growing step is more preferably 0.5 μm or more and 15 μm or less, and still more preferably 1 μm or more and 10 μm or less. The length of the CNT can be measured through observation with a scanning electron microscope.

<Drawing Step>

Subsequently, a tensile force is applied to the plurality of carbon nanotubes in the suspended state that are obtained in the growing step to draw the plurality of carbon nanotubes.

The drawing step is performed inside CNT growing unit 21 and CNT assembling unit 24, or inside CNT assembling unit 24. When the drawing step is performed inside CNT growing unit 21, the drawing step is preferably performed in CNT growing unit 21 on a downstream side of the carbon-containing gas, that is, on a side closer to the CNT assembling unit.

The tensile force is preferably applied to the plurality of carbon nanotubes by varying the carbon-containing gas in flow velocity. For example, by making an average flow velocity of the carbon-containing gas on the downstream side larger than that of the carbon-containing gas on the upstream side, a tensile force can be applied to the CNT in a direction toward the downstream side. When a tensile force acts on an end of the carbon nanotube, the carbon nanotube is pulled while extending from catalyst particle P, and thus drawn in the longitudinal direction while it is plastically deformed and reduced in diameter.

In the drawing step, the plurality of carbon nanotubes are preferably oriented in a direction along the flow of the carbon-containing gas and thus drawn. According to this, it is believed that the carbon nanotube is not easily bent, and a linear carbon nanotube having tube portion T composed only of a six-membered ring of carbon can be obtained. The carbon nanotube composed only of a six-membered ring of carbon is resistant to deterioration and can maintain quality.

The carbon-containing gas on the downstream side preferably has an average flow velocity of 0.051 cm/sec or more and 10.001 cm/sec or less, and more preferably 0.201 cm/sec or more and 5.001 cm/sec or less. When the carbon-containing gas on the downstream side has an average flow velocity of less than 0.051 cm/sec, the carbon nanotube tends to be drawn insufficiently faster than it is grown. On the contrary, if the carbon-containing gas on the downstream side has an average flow velocity exceeding 10.001 cm/sec, this tends to detach carbon nanotubes from catalyst particles P, which stops growth of the carbon nanotubes and consequently inhibits formation of carbon nanotubes.

The carbon-containing gas on the upstream side preferably has an average flow velocity of 0.050 cm/sec or more and 10.000 cm/sec or less, and more preferably 0.200 cm/sec or more and 5.000 cm/sec or less. If the carbon-containing gas on the upstream side has an average flow velocity of less than 0.050 cm/sec, insufficient wind pressure is provided, and carbon nanotubes formed between catalyst particles P tend to grow stagnantly. On the contrary, if the carbon-containing gas on the upstream side has an average flow velocity exceeding 10.000 cm/sec, this tends to detach carbon nanotubes from catalyst particles P, which stops growth of the carbon nanotubes and consequently inhibits formation of carbon nanotubes.

As a method for making the average flow velocity of the carbon-containing gas on the downstream side larger than the average flow velocity of the carbon-containing gas on the upstream side, for example, a hollow portion which passes the carbon-containing gas is formed to have a cross section smaller in area on the downstream side of the carbon-containing gas than the upstream side of the carbon-containing gas. More specifically, a hollow portion in the CNT assembling unit (corresponding to the downstream side) passing the carbon-containing gas may have a cross section smaller in area than a hollow portion in the CNT growing unit (corresponding to the upstream side) passing the carbon-containing gas. This generates an acceleration field in the vicinity of a region in which the hollow portion has a cross section reduced in area, and provides the carbon-containing gas with a faster flow velocity.

Figure 15:
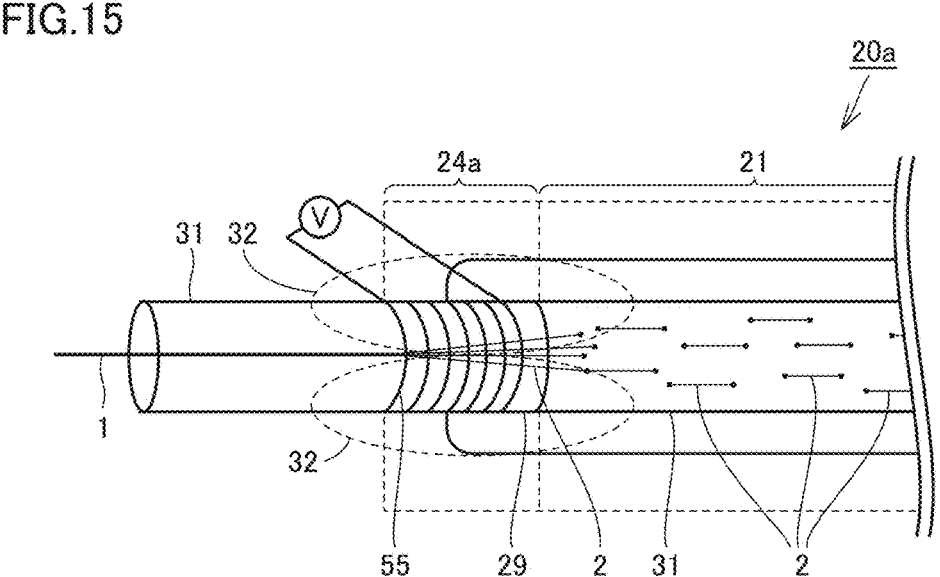
FIG. 15 is a view for illustrating an electric field generation unit of a carbon nanotube assembled wire manufacturing apparatus in accordance with another embodiment of the present disclosure.

The tensile force is preferably applied to a plurality of carbon nanotubes by using a magnetic field. A specific example of using a magnetic field as tensile force will now be described with reference to FIG. 15. FIG. 15 is a view showing a vicinity of a magnetic field generator of a CNT assembled wire manufacturing apparatus 20a. As shown in FIG. 15, in a CNT assembling unit 24a located on a downstream side of the carbon-containing gas, an electric wire 55 can be disposed in the form of a coil surrounding a reactor tube 31 and a current can be passed through electric wire 55 to generate a magnetic line of force 32 inside reactor tube 31 in a direction along the central axis of reactor tube 31 to apply tensile force derived from a magnetic field to a CNT. By applying a magnetic field when drawing a CNT, a magnetic force directly acts on metal included in the CNT, and the CNT can be oriented and drawn in a direction along magnetic line of force 32 passing inside the reactor tube.

While FIG. 15 shows the magnetic field drawing and also assembling CNTs together, the CNTs may not be drawn and assembled together simultaneously. That is, the magnetic field may only draw CNTs and may not assemble CNTs together. In this case, electric wire 30 is disposed in CNT growing unit 21 on a downstream side of the carbon-containing gas to generate a magnetic field in CNT growing unit 21.

Figure 16:
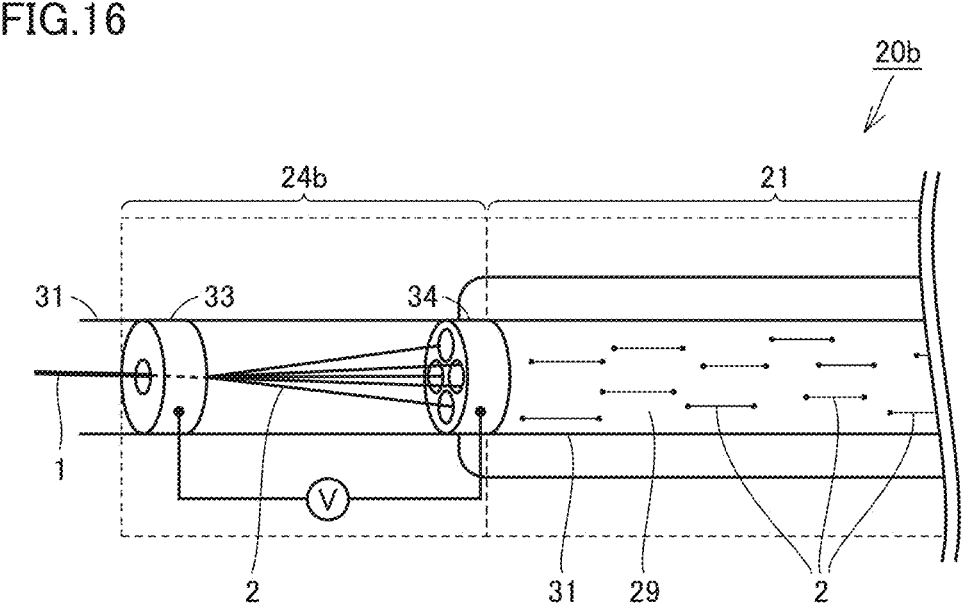
FIG. 16 is a view for illustrating a magnetic field generation unit of a carbon nanotube assembled wire manufacturing apparatus in accordance with another embodiment of the present disclosure.

The tensile force is preferably applied to a plurality of carbon nanotubes by using an electric field. A specific example of using an electric field as tensile force will now be described with reference to FIG. 16. FIG. 16 is a view showing a vicinity of an electric field generator of a CNT assembled wire manufacturing apparatus 20b. As shown in FIG. 16, in a CNT assembling unit 24b, a positive electrode 33 made of a conductive material is disposed on a downstream side of the carbon-containing gas and a negative electrode 34 made of a conductive material is disposed on an upstream side of the carbon-containing gas, and an electric field along the central axis of reactor tube 31 is generated to allow tensile force derived from the electric field to be applied to a CNT. By applying an electric field when drawing a CNT, electrostatic force acts directly on the CNT and metal included in the CNT, and the CNT can be oriented in a direction along an electric line of force and thus drawn.

While FIG. 16 shows the electric field drawing and also assembling CNTs together, the CNTs may not be drawn and assembled together simultaneously. That is, the electric field may only draw CNTs and may not assemble CNTs together. In this case, positive electrode 33 and negative electrode 34 are disposed in CNT growing unit 21 on a downstream side of the carbon-containing gas to generate an electric field in CNT growing unit 21.

While the carbon nanotube is drawn by tensile force, the carbon nanotube is grown on particle P while having its initial diameter. Thus, the carbon nanotube produced through the drawing step can include a tubular tube portion T and conical cone portions C which expand continuously in diameter from ends of the tube portion, as shown in FIG. 6.

That is, in the drawing step, a carbon nanotube formed through vapor deposition is stretched by tensile force simultaneously with the formation thereof to thereby convert some hexagonal cells of the carbon nanotube into pentagonal cells to form the conical cone portion, and convert the pentagonal cells again into hexagonal cells to form the tube portion which is a carbon nanotube with a smaller diameter.

In the drawing step, a carbon nanotube grown on catalyst particle P is grown while being stretched by using tensile force, and the tube portion can be formed at an extremely larger rate than the carbon nanotube is grown on catalyst particle P. Thus, a long carbon nanotube can be formed in a relatively short period of time. Thus, a sufficiently long carbon nanotube can be formed even if a condition allowing the carbon nanotube to be continuously grown on catalyst particle P can only be maintained for a short period of time.

It is believed that in the drawing step, causing a tensile force to act on a carbon nanotube on catalyst particle P promotes incorporation of carbon atoms at a growth point of the carbon nanotube. Thus, it is believed that the carbon nanotube can be grown further faster and hence increased in length further faster.

It is believed that, in the drawing step, by causing tensile force to act on a carbon nanotube on catalyst particle P, the carbon nanotube is less likely to be curved, and thus a linear carbon nanotube composed of a cylindrical body formed of a sheet with tube portion T consisting of a six-membered ring of carbon can be obtained. The carbon nanotube consisting of a six-membered ring of carbon is resistant to deterioration and can thus maintain quality.

The length of the CNT obtained through the drawing step is preferably 10 μm or more, and further preferably 100 μm or more. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT can be measured through observation with a scanning electron microscope.

<Assembling Step>

Subsequently, the plurality of carbon nanotubes in the suspended state are oriented and assembled together in a direction along the flow of the carbon-containing gas to obtain a carbon nanotube assembled wire. The assembling step is performed inside CNT assembling unit 24.

As a method for orienting and assembling a plurality of suspended CNTs together in a direction along a flow of the carbon-containing gas, causing the plurality of carbon nanotubes to approach one another while they are oriented is considered. More specifically, a hollow portion in the CNT assembling unit passing the carbon-containing gas may have a cross section smaller in area than a hollow portion in the CNT growing and drawing units passing the carbon-containing gas. More specifically, the CNT assembling unit may have a honeycomb structure, and the honeycomb structure may have through holes arranged to have a longitudinal direction along the flow of the carbon-containing gas.

In the present specification, the honeycomb structure means a porous body having a large number of narrow tubular through holes, as shown in FIG. 14 by a honeycomb structure 29.

When the CNT assembling unit is formed of a honeycomb structure, each through hole preferably has an area in cross section of 0.05 mm$^2$ or more and 100 mm$^2$ or less, more preferably 0.1 mm$^2$ or more and 50 mm$^2$ or less, and still more preferably 0.5 mm$^2$ or more and 10 mm$^2$ or less. When each through hole has an area in cross section of less than 0.05 mm$^2$, CNTs tend to clog inside the through hole. On the other hand, when each through hole has an area in cross section exceeding 100 mm², CNTs insufficiently approach one another, and tend to be unable to form an assembly.

When the CNT assembling unit is formed of a honeycomb structure, the honeycomb structure, as seen in a direction along the through hole (i.e., the longitudinal direction), preferably has a length of 1 mm or more and 1 m or less, more preferably 10 mm or more and 50 cm or less, and still more preferably 15 mm or more and 10 cm or less. When the honeycomb structure has a length of less than 1 mm in the direction along the through hole, the CNTs suspended in a vapor phase are insufficiently accelerated and a growth promoting effect tends to be suppressed. On the other hand, when the honeycomb structure has a length exceeding 1 m in the direction along the through hole, an amount of CNTs deposited on the internal wall of the through hole is increased, and it tends to be difficult to collect the CNTs.

The carbon-containing gas in the CNT assembling unit preferably has an average flow velocity of 0.05 cm/sec or more and 10 cm/sec or less, and more preferably 0.2 cm/sec or more and 5 cm/sec or less. When the average flow velocity of the carbon-containing gas is less than 0.05 cm/sec, a thin-film non-oriented CNT tends to be obtained. On the other hand, when the average flow velocity of the carbon-containing gas exceeds 10 cm/sec, the carbon-containing gas tends to arrive at the CNT assembling unit in an unreacted state and cause an incomplete decomposition reaction, resulting in adhesion of tar.

While in the above description the drawing step is followed by the assembling step, the drawing step and the assembling step may be performed simultaneously. Furthermore, the drawing step may be followed by an additional drawing step and an assembling step performed simultaneously. For example, when the honeycomb structure is used as the CNT assembling unit, drawing CNTs and assembling the CNTs are simultaneously performed in the through holes of the honeycomb structure.

In accordance with the above-described method for manufacturing a CNT assembled wire, a carbon-containing gas can be supplied to the catalyst supplying unit, the CNT growing unit, and the CNT assembling unit continuously, and a CNT assembled wire can be continuously manufactured without limitation on length. The CNT assembled wire can be adjusted in length, as appropriate, by adjusting the flow rate of the carbon-containing gas, how long in time it is supplied, and the like.

The length of the CNT assembled wire obtained through the assembling step is preferably 100 μm or more, more preferably 1000 μm or more, and further preferably 10000 μm or more. Although the upper limit value for the length of the CNT assembled wire is not particularly limited, it is preferably 1 m or less from the viewpoint of manufacturing. The length of the CNT assembled wire can be measured through observation with an optical microscope or visual observation.

Embodiment 3-2: Method for Manufacturing Carbon Nanotube Assembled Wire (2)

Another example of the method for manufacturing a carbon nanotube assembled wire in accordance with Embodiment 1 will now be described in Embodiment 3-2. A method for manufacturing a carbon nanotube assembled wire in accordance with Embodiment 3-2 includes: generating a mist including a plurality of catalyst particles and a carbon source in the form of liquid (hereinafter also referred to as the mist generating step); heating the mist to grow one or more carbon nanotubes from each of the plurality of catalyst particles (hereinafter also referred to as a growing step); applying a tensile force to the plurality of carbon nanotubes in a suspended state to draw the plurality of carbon nanotubes (hereinafter also referred to as a drawing step); and orienting the plurality of carbon nanotubes in a direction along their longitudinal direction and assembling the plurality of carbon nanotubes together to obtain a carbon nanotube assembled wire (hereinafter also referred to as an assembling step).

Figure 18:
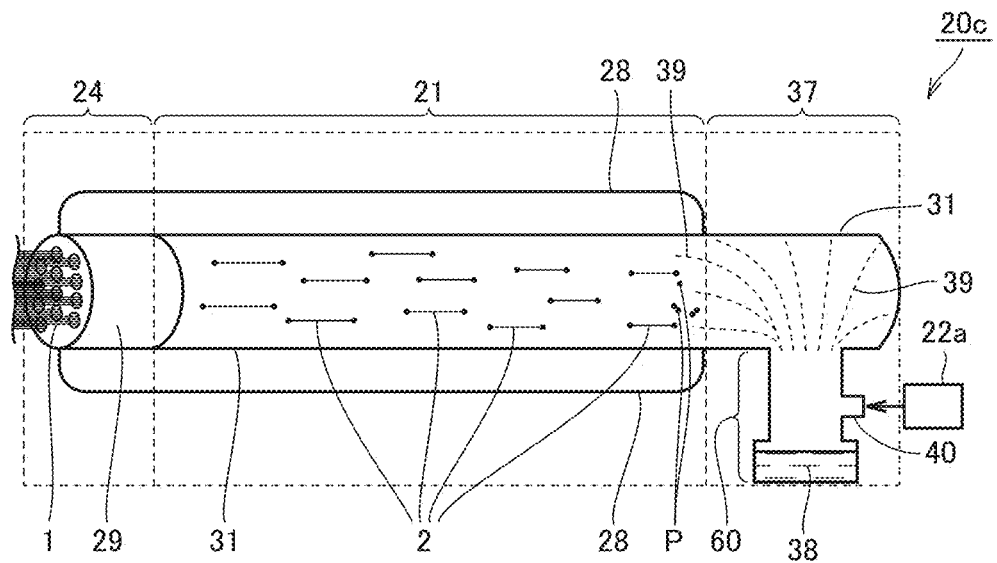
FIG. 18 is a view for illustrating a typical exemplary configuration of a carbon nanotube assembled wire manufacturing apparatus in accordance with another embodiment of the present disclosure.

The method for manufacturing the carbon nanotube assembled wire in accordance with Embodiment 3-2 can employ a carbon nanotube assembled wire manufacturing apparatus 20c shown in FIG. 18 for example.

Carbon nanotube assembled wire manufacturing apparatus 20c can include: a mist generating unit 37 that generates a mist including a plurality of catalyst particles and a carbon source in the form of liquid; a tubular carbon nanotube growing unit 21 that is coupled with mist generating unit 37 and heats mist 39 to grow one or more carbon nanotubes from each of the plurality of catalyst particles P; and carbon nanotube assembling unit 24 that is disposed at one end of carbon nanotube growing unit 21 (in FIG. 18, a left end thereof) and orients and assembles a plurality of carbon nanotubes that are obtained in carbon nanotube growing unit 21 together in a direction along their longitudinal direction to obtain a carbon nanotube assembled wire.

<Mist Generating Step>

In the mist generating step, mist 39 including a plurality of catalyst particles and a carbon source in the form of liquid is generated. The mist generating step is performed by using a mist generator 60.

The mist generating step can include a preparation step of preparing a mist source material liquid containing catalyst particles and a carbon source in the form of liquid, and an atomization step of atomizing the mist source material liquid by applying ultrasonic vibration to the mist source material liquid.

The mist obtained by atomizing the mist source material liquid preferably has an average particle diameter of 0.1 μm or more and 50 μm or less, more preferably 1 μm or more and 40 μm or less, and still more preferably 10 μm or more and 30 μm or less. When the mist has an average particle diameter of less than 0.1 μm, it tends to suppress growth of a catalyst having a particle diameter suitable for growing a CNT. On the other hand, when the mist has an average particle diameter exceeding 50 μm, it facilitates enlarging catalyst particles, and tends to decrease efficiency of growing CNTs.

In the present specification, the "average particle diameter" of the mist means a median diameter (d50) in volume-based particle size distribution (volume distribution), and means an average particle diameter of all mist particles included in the mist. It should be noted that, in the present specification, an "average particle diameter" may simply be referred to as a "particle diameter."

The particle diameter of each mist particle for calculating the particle diameter (volume average particle diameter) of the mist can be measured in the following method: Initially, a mist generator is used to generate a mist. The generated mist is irradiated with a laser beam using a dynamically light scattering, particle size distribution measuring instrument to detect a distribution in intensity of scattered light due to Brownian motion depending on the particle diameter to obtain a particle size distribution.

As the catalyst particles in the mist source material liquid, for example, particles including at least one type of metal element selected from the group consisting of iron, nickel, cobalt, molybdenum, gold, silver, copper, yttrium, chromium, palladium, platinum, and tungsten can be used. Herein, the catalyst particle including a metal element means both a case where the catalyst particle includes the metal element and another element (for example, sulfur, oxygen, etc.) together, and a case where the catalyst particle is composed of the metal element alone.

The catalyst particles in the mist source material liquid preferably include iron. In this case, the catalyst particles can be made of iron oxide ($Fe_2O_3$), ferrocene ($Fe(C_5H_5)_2$), or the like. Inter alia, the catalyst particles are more preferably made of iron oxide. Using iron oxide as the catalyst particles in the mist source material liquid is preferable from the viewpoint of mass production of CNTs. Therefore, when the catalyst particles in the mist source material liquid include iron oxide, elongate CNT assembled wires can be mass-produced.

The average particle diameter of the catalyst particles in the mist source material liquid is preferably 0.6 nm or more and less than 200 nm. According to this, the average particle diameter of the catalyst particles included in the CNT assembled wire can be 0.6 nm or more and less than 30 nm. The average particle diameter of the catalyst particles in the mist source material liquid is more preferably 1 nm or more and 100 nm or less, and still more preferably 2 nm or more and 50 nm or less.

As the carbon source in the form of liquid, ethanol, methanol, isopropyl alcohol, benzene, toluene, or xylene can be used. Inter alia, ethanol is preferable as it is a generally used reagent and is extremely harmless to the human body, and furthermore, it contains oxygen and can thus suppress formation of amorphous carbon.

The mist source material liquid may contain carbon disulfide, thiophene, and the like in addition to the catalyst particles and the carbon source in the form of liquid. Carbon disulfide, thiophene, and the like function as an assistive catalyst.

The content of the catalyst particles in the mist source material liquid is preferably 0.01% by mass or more and 5% by mass or less, more preferably 0.1% by mass or more and 4% by mass or less, and still more preferably 0.5% by mass or more and 2% by mass or less. If the content of the catalyst particles in the mist source material liquid is less than 0.01% by mass, efficiency of manufacturing CNTs tends to decrease. On the other hand, when the content of the catalyst particles in the mist source material liquid exceeds 5% by mass, the catalyst particles tend to be coarsened.

The content of the carbon source in the form of liquid in the mist source material liquid is preferably 95% by mass or more and 99.99% by mass or less, more preferably 96% by mass or more and 99.9% by mass or less, and still more preferably 98% by mass or more and 99.5% by mass or less. If the content of the carbon source in the form of liquid in the mist source material liquid is less than 95% by mass, efficiency of manufacturing CNTs tends to decrease. On the other hand, when the content of the carbon source in the form of liquid in the mist source material liquid exceeds 99.99% by mass, the carbon source is high in concentration with respect to an amount of catalyst added, and amorphous carbon tends to be produced in an increased amount.

Figure 19:
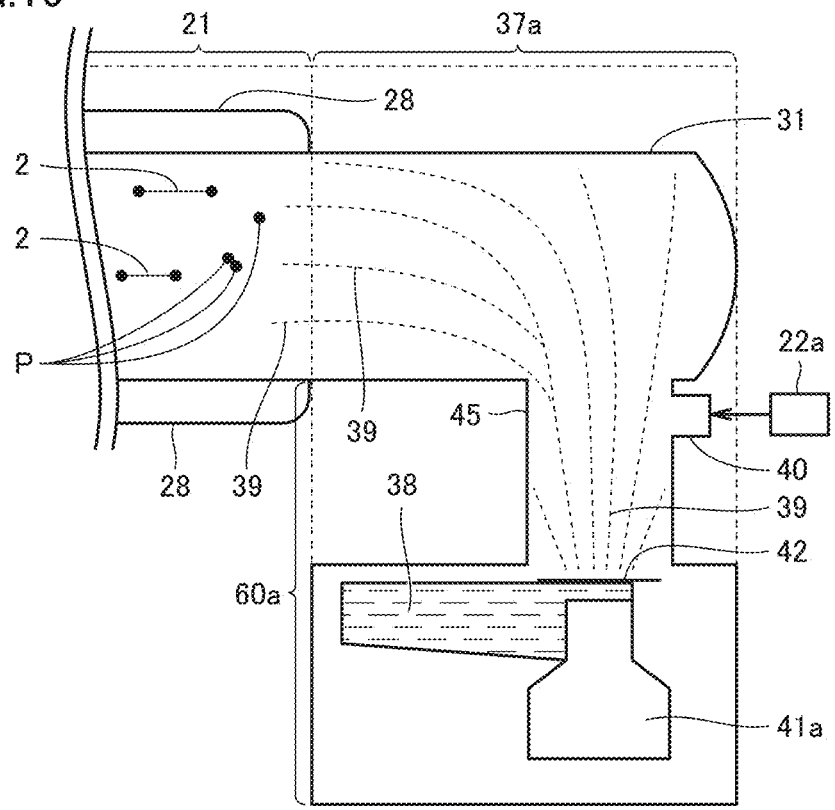
FIG. 19 is a view showing an example of a mist generating unit.
Figure 20:
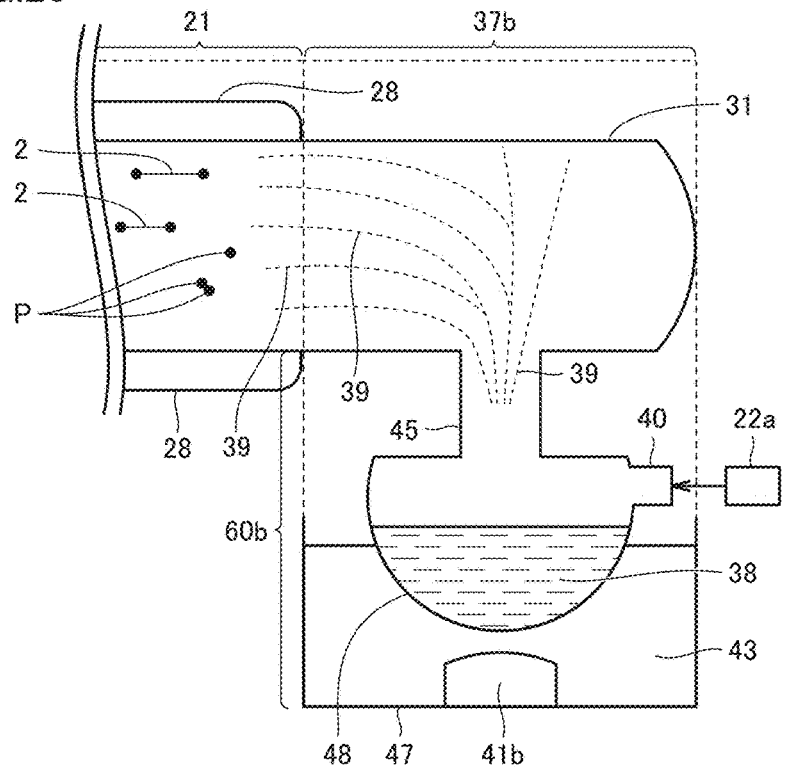
FIG. 20 is a view showing another example of the mist generating unit.
Figure 21:
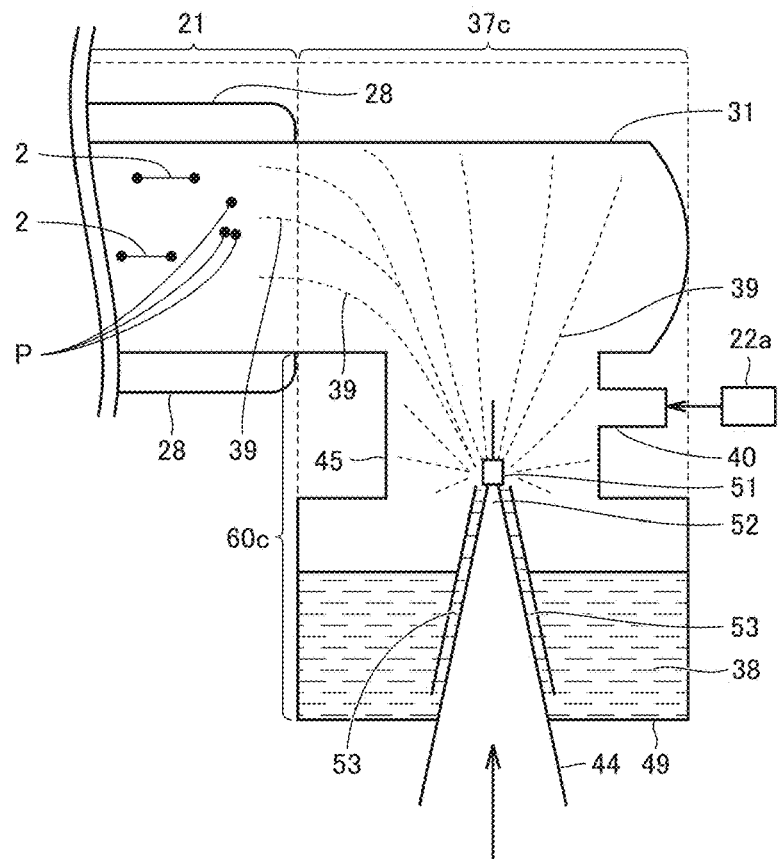
FIG. 21 is a view showing another example of the mist generating unit.

A specific example of a method for applying ultrasonic vibration to the mist source material liquid will now be described with reference to FIGS. 19 to 21. FIGS. 19 to 21 are diagrams each showing an example of mist generating unit 37 (FIG. 18).

A mist generating unit 37a shown in FIG. 19 includes a reactor tube 31 in communication with a reactor tube constituting CNT growing unit 21, and a mist generator 60a connected to reactor tube 31. That is, mist generating unit 37a is connected to CNT growing unit 21.

Mist generator 60a includes a horn transducer 41a and a mesh 42 disposed to face a vibrating surface of horn transducer 41a. Mist source material liquid 38 is supplied between the vibrating surface of horn transducer 41a and mesh 42. Horn transducer 41a applies ultrasonic vibration to mist source material liquid 38 supplied between the vibrating surface of horn transducer 41a and mesh 42. As a result, mist source material liquid 38 passes through the holes of the mesh and is thus atomized to form mist 39.

A connecting portion 45 connected to reactor tube 31 is provided above mesh 42. Mist 39 generated by mist generator 60a is supplied into reactor tube 31 via connecting portion 45.

Connecting portion 45 may be provided with a gas introduction port 40 to externally introduce gas. A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

As used herein, a mesh is defined as a thin plate having a plurality of minute openings. The opening is shaped circularly, elliptically, polygonally or the like. Inter alia, it is preferably shaped circularly from the viewpoint of generating a mist having a uniform particle diameter.

In mist generating unit 37a shown in FIG. 19, mist source material liquid 38 is atomized by passing through the holes of mesh 42. Therefore, by adjusting the diameter of the opening of the mesh, the mist's average particle diameter can be adjusted to a desired size.

The mesh preferably has the opening with a diameter of 1 μm or more and 50 μm or less, more preferably 3 μm or more and 40 μm or less, and still more preferably 5 μm or more and 30 μm or less. When the diameter of the opening is 1 μm or more and 50 μm or less, a mist obtained through the mesh can have an average particle diameter of 0.1 μm or more and 50 μm or less. When the diameter of the opening is less than 1 μm, clogging tends to occur. On the other hand, when the diameter of the opening exceeds 50 μm, coarsening of catalyst particles tends to occur in a heat treatment step during the CNT growth process. Herein, the diameter of the opening is defined as a diameter of a circle having an equal opening area (an equivalent circular diameter of the equal opening area).

The mesh preferably has 2 or more and 400 or less openings per $mm^2$, more preferably 10 more and 200 or less openings per $mm^2$, and still more preferably 20 or more and 100 or less openings per $mm^2$. When the mesh has less than two openings per $mm^2$, efficiency of generating the mist tends to be significantly reduced. On the other hand, when the mesh has more than 400 openings per $mm^2$, then, after the mist is generated, liquid droplets tend to condense and thus prevent the catalyst from becoming fine particles.

The mesh preferably has a thickness of 1 μm or more and 500 μm or less, more preferably 5 μm or more and 250 μm or less, and still more preferably 10 μm or more and 100 μm or less. When the mesh has a thickness of less than 1 μm, it tends to be reduced in resistance against repeated use. On the other hand, when the mesh has a thickness exceeding 500 μm, it tends to inhibit generation of mist as ultrasonic vibration cannot be efficiently applied.

The mesh may be made of stainless steel, for example. The horn transducer preferably has a frequency 50 kHz or more and 400 kHz or less, more preferably 70 kHz or more and 300 kHz or less, and still more preferably 100 kHz or more and 200 kHz or less. When the frequency of the horn transducer is less than 50 kHz, it is not preferable as efficiency of generating a mist is reduced. On the other hand, when the frequency of the horn transducer exceeds 400 kHz, it is not preferable as it tends to induce early deterioration of the mesh.

A mist generating unit 37b shown in FIG. 20 includes reactor tube 31 in communication with the reactor tube constituting CNT growing unit 21, and a mist generator 60b connected to reactor tube 31. That is, mist generating unit 37b is connected to CNT growing unit 21.

Mist generator 60b includes a first container 47 that holds water 43, a transducer 41b disposed at a bottom of first container 47, and a second container 48 disposed inside first container 47. At least a portion of an external surface of second container 48 is in contact with water 43. Mist source material liquid 38 is accommodated in second container 48. The second container is provided with gas introduction port 40 for externally introducing gas and connecting portion 45 connected to reactor tube 31.

A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

Transducer 41b vibrates to apply ultrasonic vibratory energy to the water. The ultrasonic vibratory energy concentrates on a surface of mist source material liquid 38, and mist source material liquid 38 is atomized by an effect of vibration (or through cavitation) to form mist 39. Mist 39 is supplied into reactor tube 31 through connecting portion 45 together with the gas introduced through gas introduction port 40.

A mist generating unit 37c shown in FIG. 21 includes reactor tube 31 in communication with the reactor tube constituting CNT growing unit 21, and a mist generator 60c connected to reactor tube 31. That is, mist generating unit 37c is connected to CNT growing unit 21.

Mist generator 60c includes a container 49 in which mist source material liquid 38 is accommodated, an air inlet port 44 for introducing compressed air generated by a compressor (not shown) into container 49, a nozzle 52 disposed above air inlet port 44 adjacently, a baffle 51 disposed above nozzle 52, and a pipe 53 allowing mist source material liquid 38 to reach the vicinity of nozzle 52.

When the compressed air introduced through air inlet port 44 is discharged through nozzle 52, a negative pressure effect is generated between nozzle 52 and pipe 53. By the negative pressure effect, mist source material liquid 38 is sucked up to an upper portion of pipe 53, collides against baffle 51, and atomizes into mist 39. Mist 39 is supplied into reactor tube 31 via connecting portion 45.

Connecting portion 45 may be provided with gas introduction port 40 to externally introduce gas. A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

<Growing Step>

In the growing step, mist 39 is heated to grow one or more carbon nanotubes from each of a plurality of catalyst particles P. The growing step is performed inside CNT growing unit 21.

When the mist is heated, the carbon source in the form of liquid included in the mist is used as a source material to grow CNTs on catalyst particles P present in the mist. In the present embodiment, a carbon source in the form of liquid included in the mist is used as a carbon source for CNTs, and it is thus unnecessary to use the carbon-containing gas used in Embodiment 3-1. This is an advantage from the viewpoint of simplifying the CNT manufacturing process and reducing the cost thereof.

The mist is heated preferably at a temperature of 800° C. or more and 1200° C. or less. That is, the growing step is preferably performed at a temperature of 800° C. or more and 1200° C. or less. If the temperature is less than 800° C., CNTs tend to be grown at a slower rate. On the other hand, when the temperature exceeds 1200° C., content of impurity carbon tends to increase. The growing step is performed under a condition in temperature of more preferably 900° C. or more and 1150° C. or less, and still more preferably 950° C. or more and 1050° C. or less.

The lower limit for the average flow velocity in the CNT growing unit of the carrier gas supplied through gas introduction port 40 is 0.05 cm/sec, preferably 0.10 cm/sec, and more preferably 0.20 cm/sec. On the other hand, the upper limit for the average flow velocity in CNT growing unit 21 is preferably 10.0 cm/sec, more preferably 5.0 cm/sec. When the average flow velocity of the carrier gas in CNT growing unit 21 is less than the lower limit, the mist tends to condense and liquefy in a core tube. On the contrary, if the average flow velocity of the carrier gas in CNT growing unit 21 exceeds the upper limit, this tends to detach carbon nanotubes from catalyst particles P, which stops growth of the carbon nanotubes and consequently inhibits formation of carbon nanotubes.

The lower limit for the Reynolds number of the flow in CNT growing unit 21 of the carrier gas supplied through gas introduction port 40 is preferably 0.01, and more preferably 0.05. On the other hand, the upper limit for the Reynolds number is 1000, preferably 100, and more preferably 10. If the Reynolds number is less than the lower limit, the apparatus is excessively restricted in design, which may make carbon nanotube assembled wire manufacturing apparatus 20 unnecessarily expensive and tends to unnecessarily lower efficiency of manufacturing carbon nanotubes. A Reynolds number exceeding the upper limit tends to disturb flow of the carbon-containing gas and inhibit production of carbon nanotubes on catalyst particles P.

The length of the CNT obtained through the growing step is preferably 0.1 µm or more and 20 µm or less. If the length of the CNT obtained through the growing step is less than 0.1 µm, adjacent CNTs would not be oriented in the longitudinal direction and instead entangled, and tend to form secondary particles. On the other hand, when the length of the CNT exceeds 20 µm, a period of time before a drawing step is performed is increased, which tends to unnecessarily decrease efficiency of manufacturing the carbon nanotube. The length of the CNT obtained through the growing step is more preferably 0.5 µm or more and 15 µm or less, and still more preferably 1 µm or more and 10 µm or less. The length of the CNT can be measured through observation with a scanning electron microscope.

<Drawing Step and Assembling Step>

The growing step is followed by a drawing step and an assembling step, which are identical to those in Embodiment 3-1, and accordingly, will not be described repeatedly.

Embodiment 4-1: Carbon Nanotube Assembled Wire Manufacturing Apparatus (1)

A carbon nanotube assembled wire manufacturing apparatus used for manufacturing a carbon nanotube assembled wire in accordance with Embodiment 1 will now be described with reference to FIG. 14. Carbon nanotube assembled wire manufacturing apparatus 20 shown in FIG. 14 can include: a tubular carbon nanotube growing unit (hereinafter also referred to as a CNT growing unit) 21; a gas supplying unit 22 that supplies a carbon-containing gas into CNT growing unit 21 from one end of CNT growing unit 21 (in FIG. 14, a right end thereof); a catalyst supplying unit 23 that supplies catalyst particles P into CNT growing unit 21; and a carbon nanotube assembling unit (hereinafter also referred to as a CNT assembling unit) 24 that is disposed at the other end of CNT growing unit 21 (in FIG. 14, a left end thereof) and orients and assembles a plurality of carbon nanotubes that are obtained in CNT growing unit 21 together in a direction along a flow of the carbon-containing gas. CNT growing unit 21, CNT assembling unit 24, and catalyst supplying unit 23 include an uninterrupted reactor tube 31, and CNTs and a CNT assembled wire are manufactured inside reactor tube 31.

<Carbon Nanotube Growing Unit>

Carbon nanotube growing unit 21 is in the form of a tube that is a quartz tube for example. In CNT growing unit 21, carbon nanotubes 2 are formed on catalyst particles P by using a carbon-containing gas.

Carbon nanotube growing unit 21 is disposed in electric furnace 28 and heated by a heater (not shown).

The internal temperature in CNT growing unit 21 is preferably 800° C. or more and 1200° C. or less. In order to maintain such a temperature, the carbon-containing gas may be heated previously and then supplied from gas supplying unit 22 into CNT growing unit 21, or the carbon-containing gas may be heated in CNT growing unit 21.

<Gas Supplying Unit>

Gas supplying unit 22 supplies the carbon-containing gas to CNT growing unit 21 at one end of carbon nanotube growing unit 21 (in FIG. 14, a right end thereof). Gas supplying unit 22 can include a gas cylinder (not shown) and a flow control valve (not shown).

The type of the carbon-containing gas supplied from gas supplying unit 22, the average flow velocity thereof in the CNT growing unit, and the Reynolds number of the flow thereof in the CNT growing unit can be the same as those described for the above-described method for manufacturing a CNT assembled wire, and accordingly, will not be described repeatedly.

Preferably, gas supplying unit 22 can repeatedly change the amount of the carbon-containing gas to be supplied to CNT growing unit 21. This can increase/decrease the flow velocity of the carbon-containing gas in CNT growing unit 21, which can help separating aggregated catalyst particles and thus increase the number of carbon nanotubes to be obtained.

<Catalyst Supplying Unit>

Catalyst supplying unit 23 may be disposed between gas supplying unit 22 and CNT growing unit 21. A catalyst holder 26 for holding catalyst 27 is disposed inside catalyst supplying unit 23. Catalyst supplying unit 23 is provided with a heater 25. That is, catalyst supplying unit 23 is heated by a heater.

Catalyst supplying unit 23 supplies a flow of the carbon-containing gas with catalyst 27 disintegrated by wind pressure of the carbon-containing gas and thus divided into a plurality of catalyst particles P. Thus, by using catalyst 27, a plurality of catalyst particles P of high temperature in contact with one another can be formed in the flow of the carbon-containing gas. This ensures that carbon nanotubes are grown among a plurality of catalysts.

Examples of catalyst 27 can include ferrocene $(Fe(C_5H_5)_2)$, nickelocene $(Ni(C_5H_5)_2)$, cobaltocene $(Co(C_5H_5)_2$, etc.), and the like. Inter alia, ferrocene is particularly preferable as it is excellent in disintegratability and catalysis. It is believed that, when ferrocene is heated to a high temperature in catalyst supplying unit 23 and exposed to the carbon-containing gas, it forms iron carbide $(Fe_3C)$ on a surface thereof due to carburization, and is thus disintegratable from the surface to release fine catalyst particles P successively. In this case, a major ingredient of catalyst particles P formed will be iron carbide or iron.

The lower limit for the average diameter of catalyst particles P is preferably 30 nm, more preferably 40 nm, and further preferably 50 nm. On the other hand, the upper limit for the average diameter of catalyst particles P is preferably 1000 μm, more preferably 100 μm, and further preferably 10 μm. If the average diameter of catalyst particles P is less than the lower limit, carbon nanotubes formed from the catalyst particles tend to have a small diameter and a low drawing ratio, and hence insufficient length. On the contrary, if the average diameter of the catalyst particles exceeds the upper limit, it tends to be difficult to draw carbon nanotubes formed by the catalyst particles.

<Carbon Nanotube Assembling Unit>

Carbon nanotube assembling unit 24 is disposed at an end of CNT growing unit 21 opposite to gas supplying unit 23. That is, CNT assembling unit 24 is disposed downstream of CNT growing unit 21 as seen in the direction of the flow of the carbon-containing gas. In CNT assembling unit 24, a carbon nanotube assembled wire is formed.

The CNT assembling unit may have any structure that can orient and assemble a plurality of suspended carbon nanotubes together in the direction of the flow of the carbon-containing gas. For example, the CNT assembling unit can have a honeycomb structure, a straight-tube-type narrow tube structure, or the like.

When the CNT assembling unit has a honeycomb structure, the honeycomb structure is disposed in the carbon nanotube assembled wire manufacturing apparatus such that the through holes have a longitudinal direction along the flow of the carbon-containing gas.

When the CNT assembling unit has a honeycomb structure, it can be identical in configuration to that described for a method described above for manufacturing a CNT assembled wire, and accordingly, it will not be described repeatedly.

The honeycomb structure can be made of a ceramic material (alumina, zirconia, aluminum nitride, silicon carbide, silicon nitride, forsterite, steatite, cordierite, mullite, ferrite, and the like), quartz glass, glass, metals, graphite. Inter alia, the ceramic material is preferable in view of heat resistance and durability required in manufacturing CNTs.

<Other Configurations>

As shown in FIG. 15, CNT assembled wire manufacturing apparatus 20a can include a magnetic field generating unit 24a that generates a magnetic field in addition to the above configuration. Magnetic field generating unit 24a is configured by disposing electric wire 30 in CNT growing unit 21 or CNT assembling unit 24 in the form of a coil surrounding reactor tube 31. When a current is passed through electric wire 55, magnetic line of force 32 can be generated inside reactor tube 31 in a direction along the central axis of reactor tube 31 to generate a magnetic field. A tensile force derived from the magnetic field can thus be applied to CNTs.

As shown in FIG. 16, CNT assembled wire manufacturing apparatus 20b can include an electric field generating unit 24b that generates an electric field in addition to the above configuration. Electric field generating unit 24b is configured by disposing in CNT growing unit 21 or CNT assembling unit 24 positive electrode 33 made of a conductive material on a downstream side of the carbon-containing gas and negative electrode 34 made of a conductive material on an upstream side of the carbon-containing gas. Thus, an electric field can be generated by generating an electric field along the central axis of reactor tube 31. A tensile force derived from the electric field can thus be applied to CNTs.

Embodiment 4-2: Carbon Nanotube Assembled Wire Manufacturing Apparatus (2)

Another example of the carbon nanotube assembled wire manufacturing apparatus used for manufacturing a carbon nanotube assembled wire in accordance with Embodiment 1 will now be described with reference to FIGS. 18 to 21. Carbon nanotube assembled wire manufacturing apparatus 20c shown in FIG. 18 can include: mist generating unit 37 that generates a mist including a plurality of catalyst particles and a carbon source in the form of liquid; tubular carbon nanotube growing unit 21 that is coupled with mist generating unit 37 and heats mist 39 to grow one or more carbon nanotubes from each of the plurality of catalyst particles P; and carbon nanotube assembling unit 24 that is disposed at one end of carbon nanotube growing unit 21 (in FIG. 18, a left end thereof) and orients and assembles a plurality of carbon nanotubes that are obtained in carbon nanotube growing unit 21 together in a direction along their longitudinal direction to obtain a carbon nanotube assembled wire.

<Mist Generating Unit>

Mist generating unit 37 generates mist 39 including a plurality of catalyst particles and a carbon source in the form of liquid. Mist generating unit 37 can apply ultrasonic vibration to mist source material liquid 38 including the catalyst particles and the carbon source in the form of liquid to atomize mist source material liquid 38 to generate mist 39.

The mist obtained by atomizing the mist source material liquid preferably has an average particle diameter of 0.1 μm or more and 50 μm or less, more preferably 1 μm or more and 40 μm or less, and still more preferably 10 μm or more and 30 μm or less. When the mist has an average particle diameter of less than 0.1 μm, it tends to suppress growth of a catalyst having a particle diameter suitable for growing a CNT. On the other hand, when the mist has an average particle diameter exceeding 50 μm, it facilitates enlarging catalyst particles, and tends to decrease efficiency of growing CNTs.

In the present specification, the "average particle diameter" of the mist means a median diameter (d50) in volume-based particle size distribution (volume distribution), and means an average particle diameter of all mist particles included in the mist. It should be noted that, in the present specification, an "average particle diameter" may simply be referred to as a "particle diameter."

The particle diameter of each mist particle for calculating the particle diameter (volume average particle diameter) of the mist can be measured in the following method: Initially, a mist generator is used to generate a mist. The generated mist is irradiated with a laser beam using a dynamically light scattering, particle size distribution measuring instrument to detect a distribution in intensity of scattered light due to Brownian motion depending on the particle diameter to obtain a particle size distribution.

As the catalyst particles in the mist source material liquid, for example, particles including at least one type of metal element selected from the group consisting of iron, nickel, cobalt, molybdenum, gold, silver, copper, yttrium, chromium, palladium, platinum, and tungsten can be used. Herein, the catalyst particle including a metal element means both a case where the catalyst particle includes the metal element and another element (for example, sulfur, oxygen, etc.) together, and a case where the catalyst particle is composed of the metal element alone.

The catalyst particles in the mist source material liquid preferably include iron. In this case, the catalyst particles can be made of iron oxide ($Fe_2O_3$), ferrocene ($Fe(C_5H_5)_2$), or the like. Inter alia, the catalyst particles are more preferably made of iron oxide. Using iron oxide as the catalyst particles in the mist source material liquid is preferable from the viewpoint of mass production of CNTs. Therefore, when the catalyst particles in the mist source material liquid include iron oxide, elongate CNT assembled wires can be mass-produced.

The average particle diameter of the catalyst particles in the mist source material liquid is preferably 0.6 nm or more and less than 200 nm. According to this, the average particle diameter of the catalyst particles included in the CNT assembled wire can be 0.6 nm or more and less than 30 nm. The average particle diameter of the catalyst particles in the mist source material liquid is more preferably 1 nm or more and 100 nm or less, and still more preferably 2 nm or more and 50 nm or less.

As the carbon source in the form of liquid, ethanol, methanol, isopropyl alcohol, benzene, toluene, or xylene can be used. Inter alia, ethanol is preferable as it is a generally used reagent and is extremely harmless to the human body, and furthermore, it contains oxygen and can thus suppress formation of amorphous carbon.

The mist source material liquid may contain carbon disulfide, thiophene, and the like in addition to the catalyst particles and the carbon source in the form of liquid. Carbon disulfide, thiophene, and the like function as an assistive catalyst.

The content of the catalyst particles in the mist source material liquid is preferably 0.01% by mass or more and 5% by mass or less, more preferably 0.1% by mass or more and 4% by mass or less, and still more preferably 0.5% by mass or more and 2% by mass or less. If the content of the catalyst particles in the mist source material liquid is less than 0.01% by mass, efficiency of manufacturing CNTs tends to decrease. On the other hand, when the content of the catalyst particles in the mist source material liquid exceeds 5% by mass, the catalyst particles tend to be coarsened.

The content of the carbon source in the form of liquid in the mist source material liquid is preferably 95% by mass or more and 99.99% by mass or less, more preferably 96% by mass or more and 99.9% by mass or less, and still more preferably 98% by mass or more and 99.5% by mass or less. If the content of the carbon source in the form of liquid in the mist source material liquid is less than 95% by mass, efficiency of manufacturing CNTs tends to decrease. On the other hand, when the content of the carbon source in the form of liquid in the mist source material liquid exceeds 99.99% by mass, the carbon source is high in concentration with respect to an amount of catalyst added, and amorphous carbon tends to be produced in an increased amount.

A specific example of a method for applying ultrasonic vibration to the mist source material liquid will now be described with reference to FIGS. 19 to 21. FIGS. 19 to 21 are diagrams each showing an example of mist generating unit 37 (FIG. 18).

A mist generating unit 37a shown in FIG. 19 includes a reactor tube 31 in communication with a reactor tube constituting CNT growing unit 21, and a mist generator 60a connected to reactor tube 31. That is, mist generating unit 37a is connected to CNT growing unit 21.

Mist generator 60a includes a horn transducer 41a and a mesh 42 disposed to face a vibrating surface of horn transducer 41a. Mist source material liquid 38 is supplied between the vibrating surface of horn transducer 41a and mesh 42. Horn transducer 41a applies ultrasonic vibration to mist source material liquid 38 supplied between the vibrating surface of horn transducer 41a and mesh 42. As a result, mist source material liquid 38 passes through the holes of the mesh and is thus atomized to form mist 39.

A connecting portion 45 connected to reactor tube 31 is provided above mesh 42. Mist 39 generated by mist generator 60a is supplied into reactor tube 31 via connecting portion 45.

Connecting portion 45 may be provided with gas introduction port 40 to externally introduce gas. A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

As used herein, a mesh is defined as a thin plate having a plurality of minute openings. The opening is shaped circularly, elliptically, polygonally or the like. Inter alia, it is preferably shaped circularly from the viewpoint of generating a mist having a uniform particle diameter.

In mist generating unit 37a shown in FIG. 19, mist source material liquid 38 is atomized by passing through the holes of mesh 42. Therefore, by adjusting the diameter of the opening of the mesh, the mist's average particle diameter can be adjusted to a desired size.

The mesh preferably has the opening with a diameter of 1 μm or more and 50 μm or less, more preferably 3 μm or more and 40 μm or less, and still more preferably 5 μm or more and 30 μm or less. When the diameter of the opening is 1 μm or more and 50 μm or less, a mist obtained through the mesh can have an average particle diameter of 0.1 μm or more and 50 μm or less. When the diameter of the opening is less than 1 μm, clogging tends to occur. On the other hand, when the diameter of the opening exceeds 50 μm, coarsening of catalyst particles tends to occur in a heat treatment step during the CNT growth process. Herein, the diameter of the opening is defined as a diameter of a circle having an equal opening area (an equivalent circular diameter of the equal opening area).

The mesh preferably has 2 or more and 400 or less openings per $mm^2$, more preferably 10 more and 200 or less openings per $mm^2$, and still more preferably 20 or more and 100 or less openings per $mm^2$. When the mesh has less than two openings per $mm^2$, efficiency of generating the mist tends to be significantly reduced. On the other hand, when the mesh has more than 400 openings per $mm^2$, then, after the mist is generated, liquid droplets tend to condense and thus prevent the catalyst from becoming fine particles.

The mesh preferably has a thickness of 1 μm or more and 500 μm or less, more preferably 5 μm or more and 250 μm or less, and still more preferably 10 μm or more and 100 μm or less. When the mesh has a thickness of less than 1 μm, it tends to be reduced in resistance against repeated use. On the other hand, when the mesh has a thickness exceeding 500 μm, it tends to inhibit generation of mist as ultrasonic vibration cannot be efficiently applied.

The mesh may be made of stainless steel, for example. Horn transducer 41a preferably has a frequency 50 kHz or more and 400 kHz or less, more preferably 70 kHz or more and 300 kHz or less, and still more preferably 100 kHz or more and 200 kHz or less. When the frequency of the horn transducer is less than 50 kHz, it is not preferable as efficiency of generating a mist is reduced. On the other hand, when the frequency of the horn transducer exceeds 400 kHz, it is not preferable as it tends to induce early deterioration of the mesh.

A mist generating unit 37b shown in FIG. 20 includes reactor tube 31 in communication with the reactor tube constituting CNT growing unit 21, and a mist generator 60b connected to reactor tube 31. That is, mist generating unit 37b is connected to CNT growing unit 21.

Mist generator 60b includes a first container 47 that holds water 43, a transducer 41b disposed at a bottom of first container 47, and a second container 48 disposed inside first container 47. At least a portion of an external surface of second container 48 is in contact with water 43. Mist source material liquid 38 is accommodated in second container 48. The second container is provided with gas introduction port 40 for externally introducing gas and connecting portion 45 connected to reactor tube 31.

A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

Transducer 41b vibrates to apply ultrasonic vibratory energy to the water. The ultrasonic vibratory energy concentrates on a surface of mist source material liquid 38, and mist source material liquid 38 is atomized by an effect of vibration (or through cavitation) to form mist 39. Mist 39 is supplied into reactor tube 31 through connecting portion 45 together with the gas introduced through gas introduction port 40.

A mist generating unit 37c shown in FIG. 21 includes reactor tube 31 in communication with the reactor tube constituting CNT growing unit 21, and a mist generator 60c connected to reactor tube 31. That is, mist generating unit 37c is connected to CNT growing unit 21.

Mist generator 60c includes a container 49 in which mist source material liquid 38 is accommodated, an air inlet port 44 for introducing compressed air generated by a compressor (not shown) into container 49, a nozzle 52 disposed above air inlet port 44 adjacently, a baffle 51 disposed above nozzle 52, and a pipe 53 allowing mist source material liquid 38 to reach the vicinity of nozzle 52.

When the compressed air introduced through air inlet port 44 is discharged through nozzle 52, a negative pressure effect is generated between nozzle 52 and pipe 53. By the negative pressure effect, mist source material liquid 38 is sucked up to an upper portion of pipe 53, collides against baffle 51, and atomizes into mist 39. Mist 39 is supplied into reactor tube 31 via connecting portion 45.

Connecting portion 45 may be provided with gas introduction port 40 to externally introduce gas. A carrier gas such as argon is introduced through gas introduction port 40. The introduction of the carrier gas can accelerate supplying the mist into reactor tube 31. A flow velocity of gas in the CNT growing unit and the CNT drawing unit can be adjusted by varying a flow velocity of the carrier gas.

<Carbon Nanotube Growing Unit>

Carbon nanotube growing unit 21 is in the form of a tube that is a quartz tube for example. In CNT growing unit 21, the carbon source in the form of liquid included in the mist is used as a source material to grow carbon nanotubes 2 on catalyst particles P.

Carbon nanotube growing unit 21 is disposed in electric furnace 28 and heated by a heater (not shown).

The mist is heated preferably at a temperature of 800° C. or more and 1200° C. or less. That is, the internal temperature in CNT growing unit 21 is preferably 800° C. or more and 1200° C. or less. In order to maintain such a temperature, the carrier gas may be heated previously and then supplied via gas introduction port 40, or the mist may be heated in CNT growing unit 21.

<Carbon Nanotube Assembling Unit>

Carbon nanotube assembling unit 24 can have the same configuration as that of the carbon nanotube assembling unit described for Embodiment 4-1, and accordingly, it will not be described repeatedly.

<Other Configurations>

CNT assembled wire manufacturing apparatus 20c can include the above-described configuration, and, in addition thereto, a magnetic field generating unit that generates a magnetic field and an electric field generating unit that generates an electric field, as in Embodiment 4-1. The magnetic field generating unit and the electric field generating unit can be identical in configuration to the magnetic field generating unit and electric field generating unit described for Embodiment 4-1, and accordingly, they will not be described repeatedly.

Embodiment 5-1: Method for Manufacturing Carbon Nanotube Assembled Wire Bundle (1)

A method for manufacturing a carbon nanotube assembled wire bundle in accordance with Embodiment 5-1 is a method for manufacturing a carbon nanotube assembled wire bundle in accordance with Embodiment 2. The method for manufacturing a carbon nanotube assembled wire bundle in accordance with Embodiment 5-1 can include: supplying a carbon-containing gas to a plurality of suspended catalyst particles to grow one or more carbon nanotubes from each of the plurality of catalyst particles (hereinafter also referred to as a growing step); applying a tensile force to the plurality of suspended carbon nanotubes to draw the plurality of carbon nanotubes (hereinafter also referred to as a drawing step); orienting and assembling the plurality of suspended carbon nanotubes together in a direction along the flow of the carbon-containing gas to obtain a plurality of carbon nanotube assembled wires (hereinafter also referred to as an assembling step); and orienting the plurality of carbon nanotube assembled wires in their longitudinal direction and thus bundling them together to obtain a carbon nanotube assembled wire bundle (hereinafter also referred to as a bundling step).

The growing, drawing and assembling steps in the method for manufacturing a carbon nanotube assembled wire bundle (1) in accordance with Embodiment 5-1 are the same as those in the method for manufacturing a carbon nanotube assembled wire (1) in accordance with Embodiment 3-1, and accordingly, they will not be described repeatedly.

<Bundling Step>

In the bundling step, a plurality of carbon nanotube assembled wires are oriented in their longitudinal direction and thus bundled together to obtain a carbon nanotube assembled wire bundle.

The bundling step and the assembling step can be performed simultaneously. That is, in the assembling step, in parallel with production of CNT assembled wires, the obtained CNT assembled wires can be oriented in a direction along the longitudinal direction and thus bundled together to obtain a CNT assembled wire bundle. In this case, the bundling step is performed inside CNT assembling unit 24.

The bundling step may be performed independently after the assembling step. That is, the bundling step can be performed after CNT assembled wires are produced in the assembling step. In this case, a CNT bundling unit is preferably connected downstream of CNT assembling unit 24 as seen in the direction of the flow of the carbon-containing gas.

The CNT bundling unit can for example be a honeycomb structure, a straight-tube-type narrow tube structure, or the like.

Embodiment 5-2: Method for Manufacturing Carbon Nanotube Assembled Wire Bundle (2)

Another example of the method for manufacturing the carbon nanotube assembled wire bundle in accordance with Embodiment 2 will now be described in Embodiment 5-2. The method for manufacturing a carbon nanotube assembled wire bundle in accordance with Embodiment 5-2 can include: generating a mist including a plurality of catalyst particles and a carbon source in the form of liquid (hereinafter also referred to as a mist generating step); heating the mist to grow one or more carbon nanotubes from each of the plurality of catalyst particles (hereinafter also referred to as a growing step); orienting and assembling the plurality of carbon nanotubes together in their longitudinal direction to obtain a carbon nanotube assembled wire (hereinafter also referred to as an assembling step); applying a tensile force to the plurality of carbon nanotubes in a suspended state to draw the plurality of carbon nanotubes (hereinafter also referred to as a drawing step); and orienting a plurality of carbon nanotube assembled wires in their longitudinal direction and thus bundling them together to obtain a carbon nanotube assembled wire bundle (hereinafter also referred to as a bundling step).

The mist generating, growing, drawing and assembling steps in the method for manufacturing a carbon nanotube assembled wire bundle in accordance with Embodiment 5-2 are the same as those in the method for manufacturing a carbon nanotube assembled wire in accordance with Embodiment 3-2, and accordingly, they will not be described repeatedly. Further, the bundling step is the same as the bundling step in the method for manufacturing a carbon nanotube assembled wire bundle in accordance with Embodiment 5-1, and accordingly, it will not be described repeatedly.

Embodiment 6-1: Carbon Nanotube Assembled Wire Bundle Manufacturing Apparatus (1)

A carbon nanotube assembled wire bundle manufacturing apparatus used for manufacturing a carbon nanotube assembled wire bundle in accordance with Embodiment 2 will be described. The carbon nanotube assembled wire bundle manufacturing apparatus can include: a tubular carbon nanotube growing unit (hereinafter also referred to as a CNT growing unit); a gas supplying unit that supplies a carbon-containing gas to the CNT growing unit at one end of the CNT growing unit; a catalyst supplying unit that supplies catalyst particles P into the CNT growing unit; a carbon nanotube assembling unit that is disposed at the other end of the CNT growing unit and orients and assembles a plurality of carbon nanotubes that are obtained in the CNT growing unit together in a direction along the flow of the carbon-containing gas (hereinafter also referred to as a CNT assembling unit); and a bundling unit that orients a plurality of carbon nanotube assembled wires in their longitudinal direction and thus bundles them together to obtain a carbon nanotube assembled wire bundle. The CNT growing unit, the CNT assembling unit, the bundling unit, and the catalyst supplying unit include an uninterrupted reactor tube, and CNTs, CNT assembled wires, and a CNT assembled wire bundle are manufactured inside the reactor tube.

The CNT growing unit, gas supplying unit, catalyst supplying unit, and CNT assembling unit in the carbon nanotube assembled wire bundle manufacturing apparatus in accordance with Embodiment 6-1 are identical in configuration to those of the carbon nanotube assembled wire manufacturing apparatus in accordance with Embodiment 4-1, and accordingly, they will not be described repeatedly.

<Bundling Unit>

In the bundling unit, a plurality of suspended CNT assembled wires are oriented in their longitudinal direction and thus bundled together to form a carbon nanotube assembled wire bundle.

The bundling unit may have any structure that can orient and assemble a plurality of suspended carbon nanotube assembled wires together in the direction of the carbon nanotube assembled wires. For example, the bundling unit can have a honeycomb structure, a straight-tube-type narrow tube structure, or the like.

When the bundling unit has a honeycomb structure, the honeycomb structure is disposed in the carbon nanotube assembled wire bundle manufacturing apparatus such that the through holes have a longitudinal direction along the flow of the carbon-containing gas.

When the bundling unit has a honeycomb structure, it can be identical in configuration to that described for the above-described CNT assembled wire manufacturing apparatus.

The bundling unit can have a structure shared by the carbon nanotube assembling unit. That is, the CNT assembling unit can also function as the bundling unit.

The bundling unit can have a structure separate from the carbon nanotube assembling unit. In this case, the bundling unit is preferably connected downstream of CNT assembling unit 24 as seen in the direction of the flow of the carbon-containing gas.

<Other Configurations>

The CNT assembled wire bundle manufacturing apparatus can include in addition to the above configuration a magnetic field generating unit that generates a magnetic field. It can be configured to be identical to the magnetic field generating unit described for the above CNT assembled wire manufacturing apparatus.

The CNT assembled wire bundle manufacturing apparatus can include, in addition to the above configuration, an electric field generating unit that generates an electric field. It can be configured to be identical to the electric field generating unit described for the above CNT assembled wire manufacturing apparatus.

Embodiment 6-2: Carbon Nanotube Assembled Wire Bundle Manufacturing Apparatus (2)

Another example of the carbon nanotube assembled wire bundle manufacturing apparatus used for manufacturing a carbon nanotube assembled wire bundle in accordance with Embodiment 2 will now be described in Embodiment 6-2. The carbon nanotube assembled wire bundle manufacturing apparatus in accordance with Embodiment 6-2 can include: a mist generating unit that generates a mist including a plurality of catalyst particles and a carbon source in the form of liquid; a tubular carbon nanotube growing unit that is coupled with the mist generating unit and heats the mist to grow one or more carbon nanotubes from each of the plurality of catalyst particles; a carbon nanotube assembling unit that is disposed at one end of the carbon nanotube growing unit and orients and assembles a plurality of carbon nanotubes that are obtained in the carbon nanotube growing unit together in a direction along their longitudinal direction to obtain a carbon nanotube assembled wire; and a bundling unit that orients a plurality of carbon nanotube assembled wires in their longitudinal direction and thus bundles them together to obtain a carbon nanotube assembled wire bundle. The mist generating unit, the CNT growing unit, the CNT assembling unit, and the bundling unit include an uninterrupted reactor tube, and CNTs, CNT assembled wires, and a CNT assembled wire bundle are manufactured inside the reactor tube.

The mist generating unit, CNT growing unit, and CNT assembling unit in the carbon nanotube assembled wire bundle manufacturing apparatus in accordance with Embodiment 6-2 are identical in configuration to those of the carbon nanotube assembled wire manufacturing apparatus in accordance with Embodiment 4-2, and accordingly, they will not be described repeatedly.

The bundling unit in the carbon nanotube assembled wire bundle manufacturing apparatus in accordance with Embodiment 6-2 has the same configuration as the bundling unit in the carbon nanotube assembled wire bundle manufacturing apparatus in accordance with Embodiment 6-1, and accordingly, it will not be described repeatedly.

Embodiment 7: Carbon Nanotube Structure

<Carbon Nanotube Structure>

Figure 23:
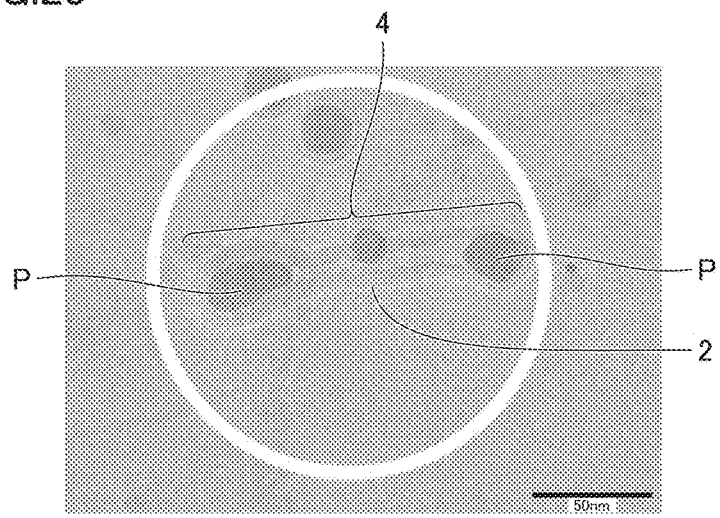
FIG. 23 is an image of a carbon nanotube structure through a transmission electron microscope (TEM) in accordance with one embodiment of the present disclosure.

FIG. 23 is an example of an image of a carbon nanotube structure (hereinafter also referred to as a CNT structure) through a transmission electron microscope (TEM) in accordance with one embodiment of the present disclosure. As shown in FIG. 23, a carbon nanotube structure 4 in accordance with the present embodiment includes a carbon nanotube 2 and catalyst particle P adhering to carbon nanotube 2 at opposite terminals, and catalyst particle P has a particle diameter of 0.6 nm or more and less than 30 nm.

(Shape)

The carbon nanotube structure has a shape in which a carbon nanotube has opposite terminals with catalyst particles adhering thereto. Herein, a carbon nanotube having opposite terminals with catalyst particles adhering thereto means that (i) the catalyst particles adhere to the CNT at the opposite terminals such that the catalyst particles are at least partially exposed from the carbon nanotube, (ii) the catalyst particles are completely embedded in the carbon nanotube at the opposite terminals and thus adhere thereto (see FIG. 23), and (iii) the carbon nanotube has one terminal with a catalyst particle adhering thereto such that the catalyst particle is at least partially exposed from the carbon nanotube, and the carbon nanotube has the other terminal with a catalyst particle adhering thereto such that the catalyst particle is completely embedded in the carbon nanotube.

The shape of the carbon nanotube is not particularly limited, and both a carbon nanotube having closed ends and a carbon nanotube having opened ends can be used. In addition, a cone portion made of a conical graphene may be formed at one end or both ends of the carbon nanotube.

The length of the carbon nanotube structure can be selected as appropriate depending on the application. The length of the carbon nanotube structure is preferably 10 μm or more, and further preferably 100 μm or more, for example. In particular, when the length of the carbon nanotube structure is 100 μm or more, such a length is suitable from the viewpoint of producing the CNT assembled wire. Although the upper limit value for the length of the carbon nanotube structure is not particularly limited, it is preferably 600 mm or less from the viewpoint of manufacturing. The length of the CNT structure can be measured through observation with a scanning electron microscope.

The diameter of the carbon nanotube structure is preferably 0.6 nm or more and 20 nm or less, and further preferably 1 nm or more and 10 nm or less. In particular, when the diameter of the carbon nanotube structure is 1 nm or more and 10 nm or less, such a diameter is suitable from the viewpoint of heat resistance under oxidizing conditions.

In the present specification, the diameter of the carbon nanotube structure means an average outer diameter of a single CNT structure at a portion without any catalyst particle adhering thereto. The average outer diameter of the CNT structure at a portion without any catalyst particle adhering thereto is obtained by directly observing cross sections at two arbitrary positions of the CNT at a portion without any catalyst particle adhering thereto with a transmission electron microscope, measuring, in each cross section, an outer diameter, which is the distance between farthest two points on the outer circumference of the CNT, and calculating an average value of the obtained outer diameters.

(Catalyst Particles)

The carbon nanotube structure has a carbon nanotube having opposite terminals with catalyst particles adhering thereto. The catalyst particle has a particle diameter of 0.6 nm or more and less than 30 nm. The catalyst particle originates from a catalyst (ferrocene ($Fe(C_5H_5)_2$), powdery iron oxide ($Fe_2O_3$), etc.) used in manufacturing the CNT assembled wire. The CNT structure in accordance with the present embodiment has catalyst particles which have an average particle diameter as small as less than 30 nm and are thus not coarsened, and hence do not affect the CNT's characteristic in electrical conductivity. Therefore, the CNT structure can be elongated while maintaining the CNT's inherent electrical conductivity.

The particle diameter of the catalyst particles included in the CNT structure can be measured in the following method: Initially, the carbon nanotube structure is observed with a transmission electron microscope (TEM) at a magnification of 100,000 to 500,000 times. Subsequently, in the TEM image, an outer diameter, which is a distance between farthest two points on the outer circumference of each catalyst particle, is measured.

The catalyst particles included in the CNT structure can include at least one type of metal element selected from the group consisting of iron, nickel, cobalt, molybdenum, gold, silver, copper, yttrium, chromium, palladium, platinum, and tungsten. Herein, a catalyst particle including a metal element means both a case where the catalyst particle includes the metal element and another element (for example, sulfur, oxygen, etc.) together, and a case where the catalyst particle is composed of the metal element alone.

The catalyst particles included in the CNT structure preferably contain iron. In this case, the catalyst particles can be formed for example of iron particles made of iron alone, or iron sulfide (FeS, $Fe_2S$), iron oxide ($Fe_2O_3$, $Fe_3O_4$). The catalyst particles are more preferably iron particles made of iron. Using iron as a catalyst is suitable from a viewpoint of mass production of CNTs. Therefore, when the catalyst particles include iron, elongate CNT assembled wires having a plurality of CNT structure can be mass-produced.

What composition the catalyst particles included in the CNT structure have and how much the former is contained in the latter can be confirmed through energy dispersive X-ray spectrometry (EDX). A total content of the catalyst particles in the CNT structure is preferably 0.01% or more and 50% or less, more preferably 0.5% or more and 40% or less, and still more preferably 0.1% or more and 20% or less on a mass basis.

(D/G Ratio)

The carbon nanotube in the carbon nanotube structure preferably has a D/G ratio of 0.1 or less, the D/G ratio being a ratio of a peak intensity of a D band to a peak intensity of a G band through a Raman spectroscopic analysis with a wavelength of 532 nm. Thus, the CNT structure can have high tensile strength and high electrical conductivity.

How the D/G ratio is measured will not be described as it is measured in the same method as described in Embodiment 1.

Embodiment 8: Method for Manufacturing Carbon Nanotube Structure

A method for manufacturing a carbon nanotube structure in accordance with Embodiment 8 is a method for manufacturing a carbon nanotube structure in accordance with Embodiment 7. The method for manufacturing a carbon nanotube structure in accordance with Embodiment 8 includes: generating a mist including catalyst particles and a carbon source in the form of liquid (hereinafter also referred to as a mist generating step); and separating a plurality of mutually closely adhering catalyst particles while heating the mist in a flow of a carrier gas to grow carbon nanotubes between the plurality of catalyst particles to obtain a CNT structure (hereinafter also referred to as the step of obtaining a CNT structure).

Figure 22:
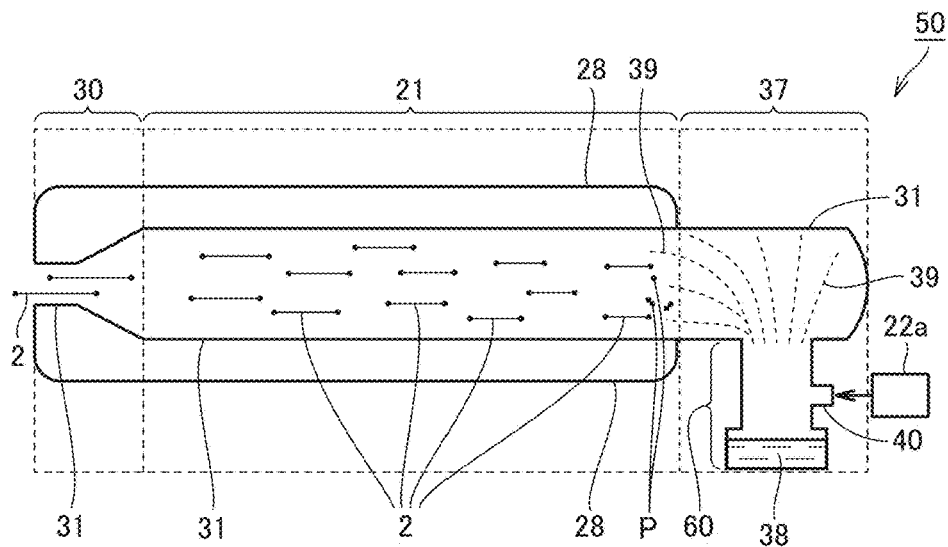
FIG. 22 is a view for illustrating a typical exemplary configuration of a carbon nanotube structure manufacturing apparatus in accordance with one embodiment of the present disclosure.

The carbon nanotube structure can be manufactured for example using a carbon nanotube structure manufacturing apparatus 50 shown in FIG. 22.

Carbon nanotube structure manufacturing apparatus 50 can include: mist generating unit 37 that generates mist 39 including catalyst particles and a carbon source in the form of liquid; gas supplying unit 22 that supplies a carrier gas into mist generating unit 37; and tubular carbon nanotube growing unit (hereinafter also referred to as a CNT growing unit) 21 coupled with mist generating unit 37.

<Mist Generating Step>

The mist generating step is the same as the mist generating step in the method for manufacturing a CNT assembled wire in accordance with Embodiment 3-2, and accordingly, it will not be described repeatedly.

<Obtaining a CNT Structure>

In the step of obtaining a CNT structure, while mist 39 is heated in the flow of the carrier gas, a plurality of mutually closely adhering catalyst particles are separated from one another to grow carbon nanotubes between the plurality of catalyst particles to obtain the CNT structure. The step of obtaining the CNT structure is performed inside CNT growing unit 21.

By heating the mist in the flow of the carrier gas, catalyst particles in the mist closely adhering to one another are separated, and at the same time, between the catalyst particles, CNTs are grown using as a source material a carbon source in the form of liquid included in the mist. In the present embodiment, a carbon source in the form of liquid included in the mist is used as a carbon source for CNTs, and it is thus unnecessary to use the carbon-containing gas used in Embodiment 3-1. This is an advantage from the viewpoint of simplifying the CNT manufacturing process and reducing the cost thereof.

The mist is heated preferably at a temperature of 800° C. or more and 1200° C. or less. That is, the step of obtaining a CNT structure is preferably performed at a temperature of 800° C. or more and 1200° C. or less. If the temperature is less than 800° C., CNTs tend to be grown at a slower rate. On the other hand, when the temperature exceeds 1200° C., content of impurity carbon tends to increase. The step of obtaining a CNT structure is performed under a condition in temperature of more preferably 900° C. or more and 1150° C. or less, and still more preferably 950° C. or more and 1050° C. or less.

As the carrier gas supplied from gas supplying unit 22, for example, argon, helium, hydrogen, nitrogen, neon, krypton, or the like can be used.

The carrier gas supplied from gas supplying unit 22 passes through mist generating unit 37 and enters CNT growing unit 21. The lower limit for the average flow velocity of the carrier gas in CNT growing unit 21 is 0.05 cm/sec, preferably 0.10 cm/sec, more preferably 0.20 cm/sec. On the other hand, the upper limit for the average flow velocity of the carrier gas in CNT growing unit 21 is preferably 10.0 cm/sec, more preferably 5.0 cm/sec. When the average flow velocity of the carrier gas in CNT growing unit 21 is less than the lower limit, the mist tends to condense and liquefy in a core tube. On the contrary, if the average flow velocity of the carrier gas in CNT growing unit 21 exceeds the upper limit, this tends to detach carbon nanotubes from catalyst particles P, which stops growth of the carbon nanotubes and consequently inhibits formation of carbon nanotubes.

The lower limit for the Reynolds number of the flow in CNT growing unit 21 of the carrier gas supplied from gas supplying unit 22 is preferably 0.01, more preferably 0.05. On the other hand, the upper limit for the Reynolds number is 1000, preferably 100, and more preferably 10. If the Reynolds number is less than the lower limit, the apparatus is excessively restricted in design, which may make carbon nanotube structure manufacturing apparatus 50 unnecessarily expensive and tends to unnecessarily lower efficiency of manufacturing the carbon nanotube structure. A Reynolds number exceeding the upper limit tends to disturb flow of the carbon-containing gas and inhibit production of carbon nanotubes on catalyst particles P.

Embodiment 9: Carbon Nanotube Structure Manufacturing Apparatus

A carbon nanotube structure manufacturing apparatus used for manufacturing a carbon nanotube structure in accordance with Embodiment 7 will now be described with reference to FIG. 22. Carbon nanotube structure manufacturing apparatus 50 shown in FIG. 22 can include: mist generating unit 37 that generates mist 39 including catalyst particles and a carbon source in the form of liquid; gas supplying unit 22 that supplies a carrier gas into mist generating unit 37; and tubular carbon nanotube growing unit (hereinafter also referred to as a CNT growing unit) 21 coupled with mist generating unit 37.

<Mist Generating Unit and CNT Growing Unit>

The mist generating unit and the CNT growing unit can be identical in configuration to those in the CNT assembled wire manufacturing apparatus described in Embodiment 4-2, and accordingly, they will not be described repeatedly.

<Gas Supplying Unit>

Gas supplying unit 22 supplies a carrier gas into mist generating unit 37. Gas supplying unit 22 can include a gas cylinder (not shown) and a flow control valve (not shown). The carrier gas supplied from gas supplying unit 22 passes through mist generating unit 37 and enters CNT growing unit 21.

The type of the carrier gas supplied from gas supplying unit 22, the average flow velocity in the CNT growing unit, and the Reynolds number of the flow in the CNT growing unit can be the same as those described in Embodiment 8 for a method for manufacturing a CNT structure, and accordingly, they will not be described repeatedly.

Preferably, gas supplying unit 22 can repeatedly change the amount of the carrier gas to be supplied to CNT growing unit 21. Thereby, the flow rate of the carrier gas in CNT growing unit 21 increases or decreases, which promotes separation of a plurality of aggregated catalyst particles, whereby increases the number of carbon nanotube structures to be obtained.

[Additional Notes]

The present disclosure is a carbon nanotube assembled wire bundle including a plurality of carbon nanotube assembled wires each according to Embodiment 1, the carbon nanotube assembled wire having the carbon nanotube oriented at a degree of orientation of 0.9 or more and 1 or less, the carbon nanotube assembled wire bundle having the carbon nanotube assembled wire oriented at a degree of orientation of 0.8 or more and 1 or less.

The carbon nanotube assembled wire bundle preferably includes an oriented region and an amorphous region.

EXAMPLES

The present embodiment will be described more specifically with reference to examples. However, the present embodiment is not limited by these examples.

[Studying Carbon Nanotube Assembled Wire (1)]

<Preparing Carbon Nanotube Assembled Wire Manufacturing Apparatus>

(Apparatus 1)

As an apparatus 1, a carbon nanotube assembled wire manufacturing apparatus having a configuration similar to that of the carbon nanotube assembled wire manufacturing apparatus outlined in FIG. 14 was prepared. Specifically, carbon nanotube growing unit 21 and carbon nanotube assembling unit 24 are disposed in electric furnace 28. The CNT growing unit is a quartz tube having an inner diameter of 20 mm and a length of 800 mm. As carbon nanotube assembling unit 24, a ceramic honeycomb structure is disposed in a quartz tube in communication with the CNT growing unit. The honeycomb structure has about 200 through holes per inch, and each throughhole has an area in cross section of 0.8 mm$^2$.

Catalyst supplying unit 23 is disposed on a side of CNT growing unit 21 opposite to a side thereof in communication with CNT assembling unit 24. Catalyst supplying unit 23 is a quartz tube having an inner diameter of 20 mm and a length of 200 mm, and is disposed in communication with the CNT growing unit. In catalyst supplying unit 23, ferrocene is disposed as a catalyst on catalyst holder 26. Catalyst supplying unit 23 is heated by heater 25.

Gas supplying unit 22 is disposed on a side of catalyst supplying unit 23 opposite to a side thereof connected to CNT growing unit 21.

(Apparatus 2)

As an apparatus 2, an apparatus having a configuration basically similar to that of apparatus 1 was prepared. Apparatus 2 differs from apparatus 1 in that the former does not include carbon nanotube assembling unit 24. That is, in this apparatus, the CNT assembling unit is not disposed at an end of CNT growing unit 21 that is located on a side opposite to a side in communication with catalyst supplying unit 23.

<Producing Carbon Nanotube Assembled Wire>

Carbon nanotube assembled wires for samples 1 and 2 were produced using apparatuses 1 and 2, respectively, as manufacturing apparatuses. Initially, in each of apparatuses 1 and 2, an electric furnace's internal temperature was raised to 1000° C. while argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit.

Figure 17:
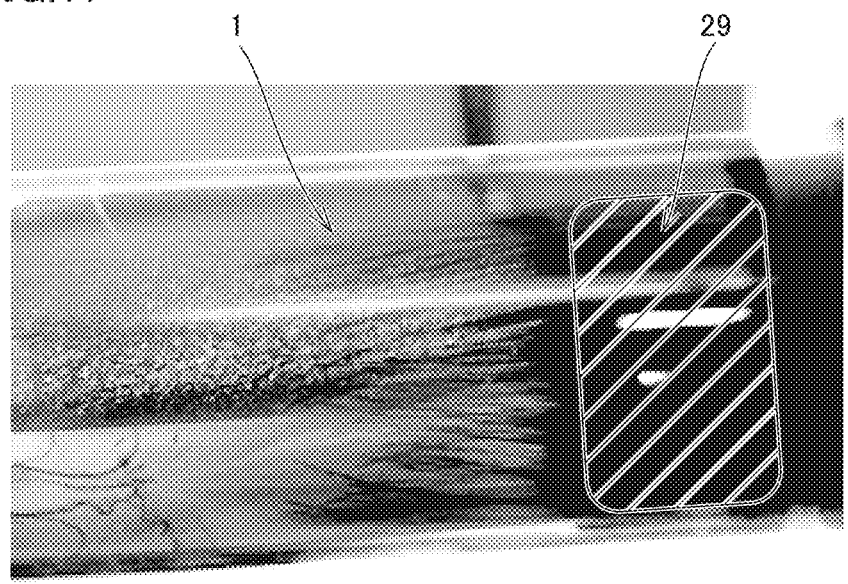
FIG. 17 is an image of a carbon nanotube assembled wire of a sample 1.

Thereafter, in apparatus 1, CNTs were drawn and assembled together in the CNT assembling unit and a CNT assembled wire was thus obtained. When a downstream side of the honeycomb structure constituting the CNT assembling unit of apparatus 1 was visually observed, then, as shown in FIG. 17, it has been confirmed that carbon nanotube assembled wire 1 (sample 1) formed of a plurality of CNTs assembled together was discharged through a through hole of honeycomb structure 29.

When a downstream side of the CNT growing unit in apparatus 2 was observed with a SEM, a CNT assembled wire (sample 2) having a plurality of CNTs assembled together was confirmed.

<Measuring Carbon Nanotube Assembled Wire>

(Degree of Orientation)

The carbon nanotube assembled wires of samples 1 and 2 had their degrees of orientation measured. The method for calculating the degrees of orientation is the same as the method described in Embodiment 1, and accordingly, it will not be described repeatedly.

A TEM image of the CNT assembled wire of sample 1 is shown in FIG. 2, and a Fourier transformed image thereof is shown in FIG. 4. FIG. 5 shows a relationship between angle of orientation and intensity of orientation presented by sample 1.

Sample 1 provided a full width at half maximum of 12° and a degree of orientation of 0.93. Sample 1 was confirmed to correspond to an example.

Sample 2 provided a full width at half maximum of 54° and a degree of orientation of 0.70. Sample 2 was confirmed to correspond to a comparative example.

(Shape)

The carbon nanotube assembled wire of sample 1 had its average length and average diameter measured. How the average length and the average diameter were measured is the same as has been described in Embodiment 1, and accordingly, it will not be described repeatedly.

The CNT assembled wire of sample 1 was in the form of a linear yarn composed of a plurality of carbon nanotubes oriented and assembled together in their longitudinal direction, and had an average length of 10 cm and an average diameter of 50 µm.

(Elements Originating from Catalyst)

The carbon nanotube assembled wire of sample 1 was subjected to EDX analysis to identify an element included in the CNT assembled wire that originates from the catalyst.

Sample 1 was confirmed to include iron and sulfur. In addition, through SEM observation and EDX analysis, it has been confirmed that iron and sulfur are dispersed longitudinally of the CNT assembled wire.

[Studying Carbon Nanotube Assembled Wire Bundle]

<Preparing Carbon Nanotube Assembled Wire Bundle Manufacturing Apparatus>

(Apparatus 3)

As an apparatus 3, a carbon nanotube assembled wire bundle manufacturing apparatus having a configuration basically similar to that of apparatus 1 was prepared. Apparatus 3 differs from apparatus 1 in that the former introduces an orifice plate on the outlet side of the honeycomb in order to converge CNT assembled wires to one point.

(Apparatus 4)

As an apparatus 4, an apparatus having a configuration basically similar to that of apparatus 3 was prepared. The apparatus differs from apparatus 3 in that the former does not include a mechanism for converging CNT assembled wires.

<Producing a Carbon Nanotube Assembled Wire Bundle>

Carbon nanotube assembled wire bundles for samples 3 and 4 were produced using manufacturing apparatuses that are apparatuses 3 and 4, respectively. Initially, in each of apparatuses 3 and 4, an electric furnace's internal temperature was raised to 1000° C. while an argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit.

Thereafter, in apparatus 3, CNTs were drawn and assembled together in the CNT assembling unit and CNT assembled wires were thus obtained, and the CNT assembled wires were bundled together and a CNT assembled wire bundle was thus obtained. When a downstream side of the honeycomb structure constituting the CNT assembling unit of apparatus 3 was visually observed, it has been confirmed that a carbon nanotube assembled wire bundle (sample 3) formed of a plurality of CNT assembled wires assembled together was discharged through a through hole of honeycomb structure 29.

When a downstream side of the CNT growing unit in apparatus 4 was observed with a SEM, a CNT assembled wire bundle (sample 4) having a plurality of CNT assembled wires assembled together was confirmed.

<Measuring a Carbon Nanotube Assembled Wire Bundle>

(Degree of Orientation)

The carbon nanotube assembled wire bundles of samples 3 and 4 had their degrees of orientation measured. The method for calculating a degree of orientation of CNT in a CNT assembled wire is the same as the method described in Embodiment 1, and accordingly, it will not be described repeatedly. The method for calculating a degree of orientation of a CNT assembled wire in a CNT assembled wire bundle is the same as that described in Embodiment 2, and accordingly, it will not be described repeatedly.

The CNT assembled wire bundle of sample 3 is composed of CNT assembled wires composed of CNTs having a degree of orientation of 0.94, and the CNT assembled wire bundle includes an oriented region in which the CNT assembled wire is oriented at a degree of orientation of 0.93. That is, it has been confirmed that sample 3 corresponds to an example. In sample 3, CNT assembled wires were successfully assembled together to form a CNT assembled wire bundle without impairing the CNT assembled wires in degree of orientation.

The CNT assembled wire bundle of sample 4 is composed of CNT assembled wires composed of CNTs having a degree of orientation of 0.93, and, in any measurement field of view, had the CNT assembled wires with a degree of orientation having a maximum value of 0.76, and the CNT assembled wire bundle does not include an oriented region. That is, it has been confirmed that sample 4 corresponds to a comparative example.

(Shape)

The carbon nanotube assembled wire bundle of sample 3 had its average length and average diameter measured. How the average length and the average diameter were measured is the same as has been described in Embodiment 2, and accordingly, it will not be described repeatedly.

The CNT assembled wire bundle of sample 3 was in the form of a linear yarn composed of a plurality of carbon nanotube assembled wires oriented and assembled together in their longitudinal direction, and had an average length of 10 cm and an average diameter of 200 μm.

(Elements Originating from Catalyst)

CNT assembled wires included in the carbon nanotube assembled wire bundle of sample 3 were subjected to EDX analysis to identify an element included in the CNT assembled wire that originates from the catalyst.

Sample 3 was confirmed to include iron and sulfur. In addition, through SEM observation and EDX analysis, it has been confirmed that iron and sulfur are dispersed longitudinally of the CNT assembled wire.

(Proportion of Oriented Region and Amorphous Region)

The carbon nanotube assembled wire bundle of sample 3 was subjected to measurement of a proportion in volume of the oriented region and the amorphous region. How the proportion in volume of the oriented region and the amorphous region was measured is the same as described in Embodiment 2, and accordingly, it will not be described repeatedly.

The CNT assembled wire bundle of sample 3 had 80% by volume of oriented region and 20% by volume of amorphous region.

(Distance Between Carbon Nanotube Assembled Wires)

The carbon nanotube assembled wire bundle of sample 3 was subjected to measurement of a minimum value of a distance between adjacent ones of a plurality of carbon nanotube assembled wires in the oriented region. It was also subjected to measurement of an average diameter of the CNT assembled wires constituting the CNT assembled wire bundle. How a minimum value of a distance between adjacent ones of the plurality of carbon nanotube assembled wires in the oriented region and an average diameter of the CNT assembled wires were measured is the same as has been described in Embodiment 2, and accordingly, it will not be described repeatedly.

In sample 3, the minimum value of the distance between adjacent ones of the plurality of carbon nanotube assembled wires in the oriented region was 300 nm, and the average diameter of the CNT assembled wires was 25 nm. That is, it has been confirmed that the minimum value of the distance between adjacent ones of the plurality of carbon nanotube assembled wires was 10 times or more the average diameter of the plurality of carbon nanotube assembled wires.

(Angle Between Carbon Nanotube Assembled Wires)

The carbon nanotube assembled wire bundle of sample 3 was subjected to measurement of a maximum value of an angle between adjacent carbon nanotube assembled wires in the oriented region. How an angle between adjacent carbon nanotube assembled wires in the oriented region was measured is the same as has been described in Embodiment 2, and accordingly, it will not be described repeatedly.

In sample 3, the oriented region has adjacent carbon nanotube assembled wires forming an angle having a maximum value of 9°. That is, it has been confirmed that the maximum value of the angle between adjacent carbon nanotube assembled wires was 10° or less.

(Elongation at Break, Breaking Strength, Young's Modulus)

The carbon nanotube assembled wire bundle of sample 3 was subjected to a breaking test to measure its elongation at break, breaking strength, and Young's modulus. How the test was conducted is the same as has been described in Embodiment 2, and accordingly, it will not be described repeatedly. A result thereof is shown in the graph of FIG. 27.

Figure 27:
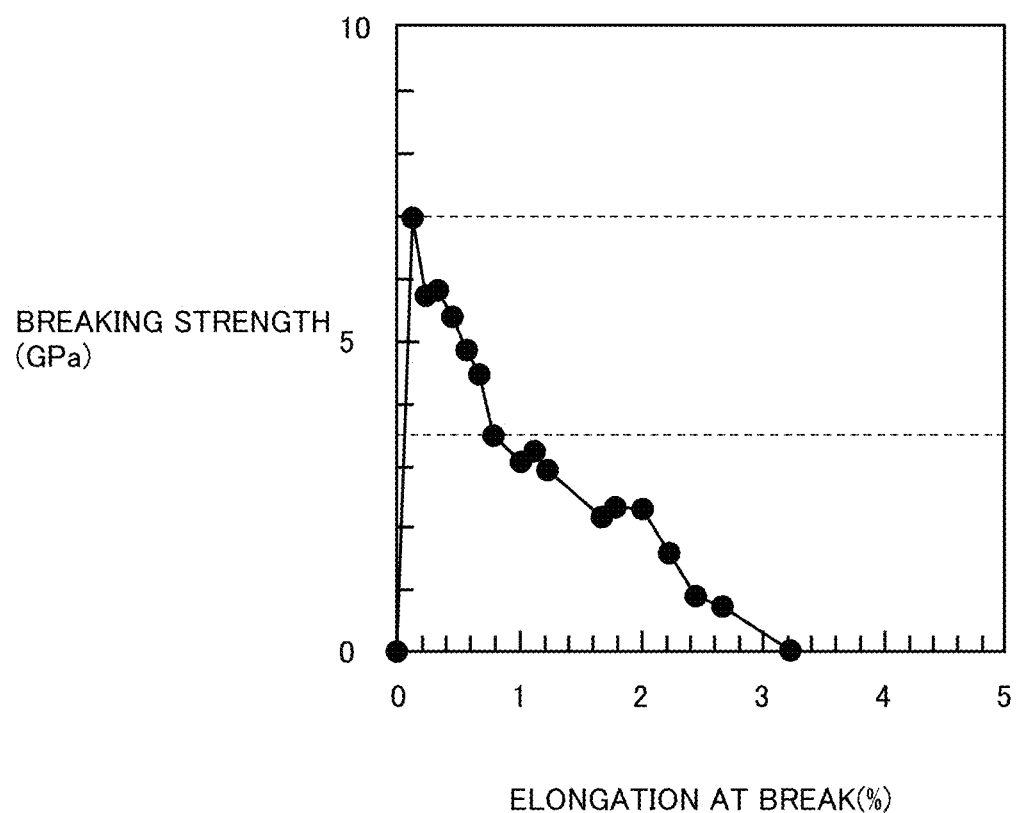
FIG. 27 is a graph showing a result of a fracture test of a carbon nanotube assembled wire bundle of a sample 3.

In the graph of FIG. 27, the horizontal axis (the X axis) represents elongation at break (%), and the vertical axis (the Y axis) represents breaking strength (GPa). As shown in FIG. 27, it has been confirmed that the CNT assembled wire bundle of sample 3 had an elongation at break of 0.1%, a breaking strength of 7 GPa, and a Young's modulus of 1100 GPa.

(Content of First Metal)

The carbon nanotube assembled wire bundle of sample 3 was subjected to EDX to measure a total content of the first metal element. The total content of the first metal element in the CNT assembled wire bundle of sample 3 was 10% by mass.

[Studying Carbon Nanotube Assembled Wire (2)]

<Preparing Carbon Nanotube Assembled Wire Manufacturing Apparatus>

(Apparatus 5)

As an apparatus 5, a carbon nanotube assembled wire manufacturing apparatus having a configuration similar to that of a carbon nanotube assembled wire manufacturing apparatus outlined as shown in FIG. 18 was prepared. Specifically, carbon nanotube growing unit 21 and carbon nanotube assembling unit 24 are disposed in electric furnace 28. The CNT growing unit is a quartz tube having an inner diameter of 25 mm and a length of 50 mm. As carbon nanotube assembling unit 24, a ceramic honeycomb structure is disposed in a quartz tube in communication with the CNT growing unit. The honeycomb structure has about 200 through holes per inch, and each throughhole has an area in cross section of 0.8 mm².

Mist generating unit 37 is disposed on a side of CNT growing unit 21 opposite to a side thereof where CNT assembling unit 24 is disposed. Mist generating unit 37 has a configuration similar to mist generating unit 37a shown in FIG. 19. Mist generating unit 37a includes a quartz tube disposed in communication with CNT growing unit 21 and having an inner diameter of 25 mm and a length of 200 mm, and mist generator 60a connected to the quartz tube. Gas introduction port 40 is provided at connecting portion 45 of mist generator 60a. A carrier gas is supplied from gas supplying unit 22 to gas introduction port 40, passes through mist generating unit 37a, and enters CNT growing unit 21.

Mist generator 60a includes horn transducer 41a and mesh 42 disposed to face a vibrating surface of horn transducer 41a. The mesh is made of a metal plate having a thickness of 10 μm, and has 100 openings per mm² each in the form of a circle having a diameter of 20 μm. The horn transducer has a frequency of 110 kHz.

<Producing a Carbon Nanotube Assembled Wire>

Apparatus 5 was used as a manufacturing apparatus to produce carbon nanotube assembled wires for samples 5-1 and 5-2.

For sample 5-1, ferrocene was dispersed in ethanol to produce a mist source material liquid. The concentration of the ferrocene in the mist source material liquid is 1% by weight.

For sample 5-2, powdery iron oxide ($Fe_2O_3$, with an average particle diameter of 70 nm) was dispersed in ethanol to produce a mist source material liquid. The concentration of the powdery iron oxide in the mist source material liquid was 2% by weight.

With the mist source material liquid used to generate a mist by mist generator 60a, an electric furnace's internal temperature was raised to 1000° C. while argon gas having an argon gas concentration of 100% by volume was supplied from the gas supplying unit into the CNT growing unit at a flow rate of 1000 cc/min (flow velocity: 3.4 cm/sec) for 50 minutes. The mist had an average particle diameter of 35 μm. Thus, CNTs were grown in the CNT growing unit.

Figure 25:
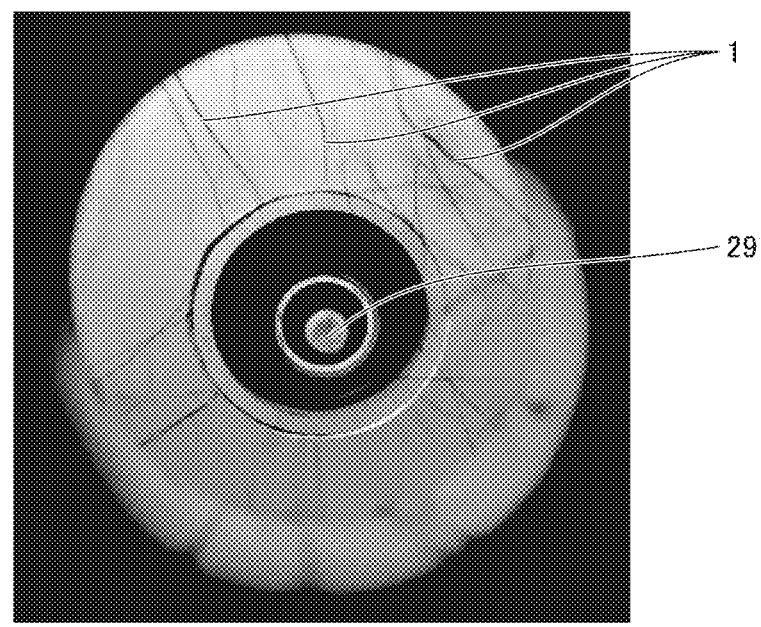
FIG. 25 is an image of a carbon nanotube assembled wire of sample 5-2.

Thereafter, in any of samples 5-1 and 5-2, CNTs were drawn and assembled together in the CNT assembling unit and a CNT assembled wire was thus obtained. When a downstream side of the honeycomb structure constituting the CNT assembling unit of apparatus 5 was visually observed, then, in any of samples 5-1 and 5-2, it has been confirmed that carbon nanotube assembled wire 1 formed of a plurality of CNTs assembled together was discharged through a through hole of honeycomb structure 29. FIG. 25 shows an image of the carbon nanotube assembled wire obtained in sample 5-2.

<Measuring a Carbon Nanotube Assembled Wire>

(Degree of Orientation)

The carbon nanotube assembled wires of samples 5-1 and 5-2 had their degrees of orientation measured. The method for calculating the degrees of orientation is the same as the method described in Embodiment 1, and accordingly, it will not be described repeatedly.

Sample 5-1 provided a full width at half maximum of 12° and a degree of orientation of 0.93. Sample 5-1 was confirmed to be an example.

Sample 5-2 provided a full width at half maximum of 14° and a degree of orientation of 0.92. Sample 5-2 was confirmed to be an example.

(Shape)

The carbon nanotube assembled wires of samples 5-1 and 5-2 were measured in average length and average diameter. How average length and average diameter were measured is the same as has been described in Embodiment 1, and accordingly, it will not be described repeatedly.

The CNT assembled wire of sample 5-1 was in the form of a linear yarn composed of a plurality of carbon nanotubes oriented and assembled together in their longitudinal direction, and had an average length of 10 cm and an average diameter of 55 μm.

The CNT assembled wire of sample 5-2 was in the form of a linear yarn composed of a plurality of carbon nanotubes oriented and assembled together in their longitudinal direction, and had an average length of 15 cm and an average diameter of 60 μm.

When the carbon nanotube assembled wires of samples 5-1 and 5-2 were observed with a TEM, it has been confirmed that a plurality of carbon nanotubes each had one or opposite terminals with a catalyst particle adhering thereto. That is, it has been confirmed that the carbon nanotube assembled wires of samples 5-1 and 5-2 included a carbon nanotube structure.

(Catalyst Particles)

The carbon nanotube assembled wires of samples 5-1 and 5-2 were each subjected to EDX analysis to identify a composition of catalyst particles included in the CNT assembled wire.

It has been confirmed that the carbon nanotube assembled wires of samples 5-1 and 5-2 included catalyst particles of iron particles. In addition, through SEM observation and EDX analysis, it has been confirmed that iron particles are dispersed longitudinally of the CNT assembled wire.

Figure 24:
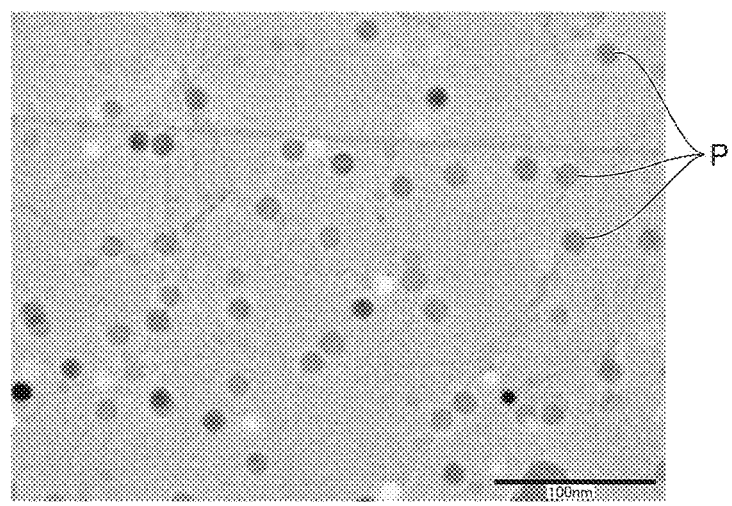
FIG. 24 is an image of a carbon nanotube structure of a sample 5-2 through a transmission electron microscope (TEM).

Further, when sample 5-2 was further observed with a SEM, it has been confirmed that the iron particles were substantially spherical and had a substantially uniform particle diameter, as shown in FIG. 24.

The carbon nanotube assembled wires of samples 5-1 and 5-2 had their catalyst particles subjected to measurement of average particle diameter. How the catalyst particles' average particle diameter was measured is the same as has been described in Embodiment 1, and accordingly, it will not be described repeatedly.

Figure 26:
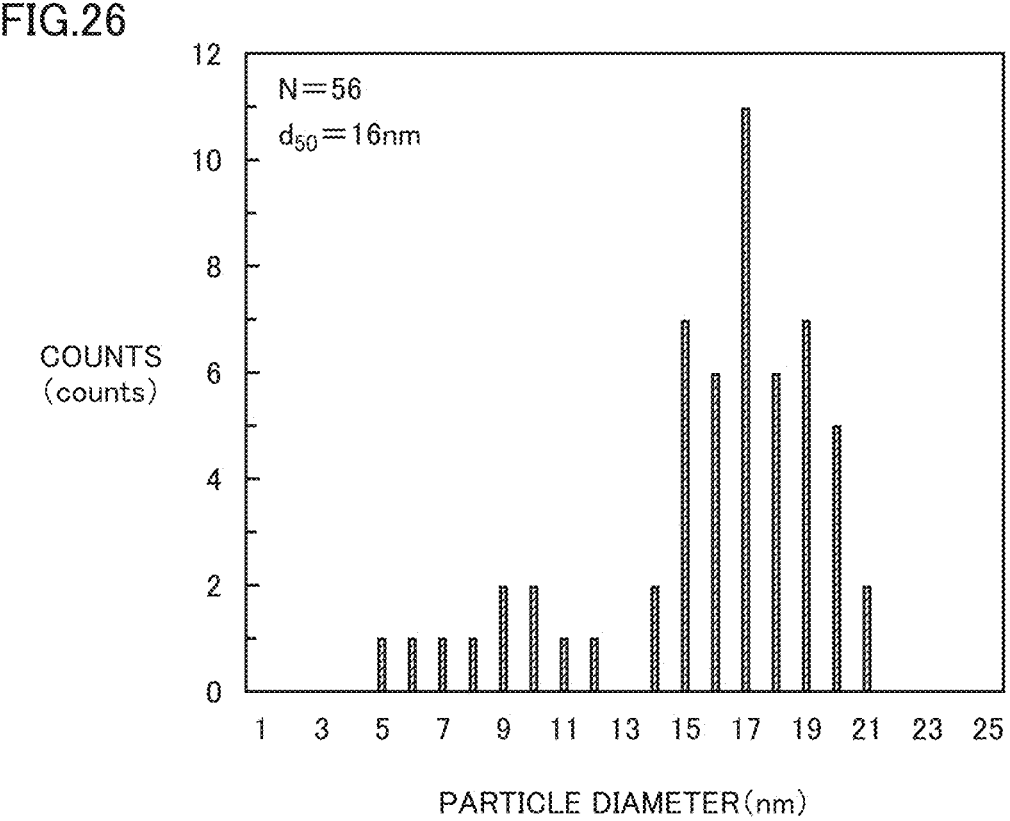
FIG. 26 is a graph showing a particle size distribution of catalyst particles in the carbon nanotube assembled wire of sample 5-2.

Sample 5-1 had catalyst particles with an average particle diameter of 15 nm. Sample 5-2 had catalyst particles with an average particle diameter of 16 nm. FIG. 26 shows a particle size distribution of the catalyst particles in the carbon nanotube assembled wire obtained in sample 5-2. In FIG. 26, the horizontal axis (the X axis) represents particle diameter (in nm), and the vertical axis (the Y axis) represents particle count (counts). From FIG. 26, it has been confirmed that the carbon nanotube assembled wire obtained in sample 5-2 had catalyst particles with a particle diameter of 5 nm or more and 21 nm or less.

While embodiments and examples of the present disclosure have been described as above, it is also planned from the beginning that the configurations of the above-described embodiments and examples are appropriately combined and variously modified.

The embodiments and examples disclosed herein are illustrative in any respects and should not be construed as being restrictive. The scope of the present invention is defined by the scope of the claims, rather than the embodiments and the examples described above, and is intended to include any modifications within the scope and meaning equivalent to the scope of the claims.

REFERENCE SIGNS LIST 1, 1a, 1b, 1c, 1d carbon nanotube assembled wire, 2 carbon nanotube, 3 carbon nanotube assembled wire bundle 20, 20a, 20b, 20c CNT assembled wire manufacturing apparatus, 21 CNT growing unit, 22 gas supplying unit, 23 catalyst supplying unit, 24, 24a carbon nanotube assembling unit, 25 heater, 26 catalyst holder, 27 catalyst, 28 electric furnace, 29 honeycomb structure, 30 CNT drawing unit, 31 reactor tube, 32 magnetic line of force, 33 positive electrode, 34 negative electrode, 35 oriented region, 36 amorphous region, 37 mist generating unit, 38 mist source material liquid, 39 mist, 40 gas introduction port, 41a horn transducer, 41b transducer, 42 mesh, 43 water, 44 air inlet port, 45 connecting portion, 47 first container, 48 second container, 49 container, 50 CNT structure manufacturing apparatus, 51 baffle, 52 nozzle, 53 pipe, 55 electric wire 60, 60a, 60b, 60c mist generator, T tube portion, C cone portion, P catalyst particle.

The invention claimed is:

1. A carbon nanotube assembled wire comprising a plurality of carbon nanotubes,
the plurality of carbon nanotubes being oriented at a degree of orientation of 0.9 or more and 1 or less, wherein
the carbon nanotube assembled wire has catalyst particles, and
the catalyst particles have an average particle diameter of 0.6 nm or more and less than 30 nm.

2. The carbon nanotube assembled wire according to claim 1, wherein
the carbon nanotube assembled wire includes at least one type of metal element selected from the group consisting of iron, nickel, cobalt, molybdenum, gold, silver, copper, yttrium, chromium, palladium, platinum, and tungsten, and
the metal element is dispersed in the carbon nanotube assembled wire in a longitudinal direction thereof.

3. The carbon nanotube assembled wire according to claim 1, wherein the catalyst particles include iron.

4. The carbon nanotube assembled wire according to claim 1, wherein
the carbon nanotube assembled wire includes the element of sulfur, and
the element of sulfur is dispersed in the carbon nanotube assembled wire in a longitudinal direction thereof.

5. A carbon nanotube assembled wire bundle comprising a plurality of carbon nanotube assembled wires each according to claim 1,
the plurality of carbon nanotube assembled wires having the carbon nanotubes oriented at a degree of orientation of 0.9 or more and 1 or less,
the carbon nanotube assembled wire bundle having an oriented region in which the plurality of carbon nanotube assembled wires is oriented at a degree of orientation of 0.8 or more and 1 or less.

6. The carbon nanotube assembled wire bundle according to claim 5, wherein the carbon nanotube assembled wire bundle includes the oriented region and an amorphous region in which the plurality of carbon nanotube assembled wires has a degree of orientation of 0 or more and less than 0.8.

7. The carbon nanotube assembled wire bundle according to claim 5, wherein in at least a portion of the oriented region, a minimum value of a distance between adjacent ones of the plurality of carbon nanotube assembled wires is 10 times or more an average diameter of the plurality of carbon nanotube assembled wires.

8. The carbon nanotube assembled wire bundle according to claim 5, wherein the carbon nanotube assembled wire bundle has an elongation at break of 0.1% or more and a breaking strength of 1 GPa or more.

9. The carbon nanotube assembled wire bundle according to claim 5, wherein the carbon nanotube assembled wire bundle has a Young's modulus of 10 GPa or more.

10. The carbon nanotube assembled wire bundle according to claim 5, wherein the carbon nanotube assembled wire bundle includes at least one type of a first element selected from the group consisting of iron, sulfur, nickel, cobalt, molybdenum, gold, silver, copper, yttrium, chromium, palladium, platinum, and tungsten in a total amount of 10% by mass or less.

11. A carbon nanotube structure comprising:
a carbon nanotube;
a cone portion made of a conical graphene being formed at one end or both ends of the carbon nanotube, and
a catalyst particle adhering to opposite terminals of the carbon nanotube,
the catalyst particle having a diameter of 0.6 nm or more and less than 30 nm.

12. The carbon nanotube structure according to claim 11, wherein the catalyst particle includes iron.

* * * * *